INVENTORS
SAMUEL SHARIN
THOMAS R. SHERIDAN
ANTHONY LIGUORI &
HAJIME J. KISHI
BY Charles H. Brown
ATTORNEY Sept. 25, 1962 S. SHARIN ET AL 3,055,978

CONTROL CIRCUIT

Filed Dec. 13, 1956 5 Sheets-Sheet 2

INVENTORS
SAMUEL SHARIN
THOMAS R. SHERIDAN
ANTHONY LIGUORI &
HAJIME J. KISHI
BY Charles H. Brown
ATTORNEY INVENTORS
SAMUEL SHARIN
THOMAS R. SHERIDAN
ANTHONY LIGUORI &
HAJIME J. KISHI
BY
Charles H. Brown
ATTORNEY INVENTORS
SAMUEL SHARIN
THOMAS R. SHERIDAN
ANTHONY LIGUORI &
HAJIME J. KISHI
BY Charles H. Brown
ATTORNEY

INVENTORS
SAMUEL SHARIN
THOMAS R. SHERIDAN
ANTHONY LIGUORI &
HAJIME J. KISHI

BY Charles H. Brown
ATTORNEY 3,055,978
CONTROL CIRCUIT

Samuel Sharin and Thomas R. Sheridan, Brooklyn, and Anthony Liguori and Hajime James Kishi, Huntington Station, N.Y., assignors to Radio Corporation of America, a corporation of Delaware Filed Dec. 13, 1956, Ser. No. 628,088
21 Claims. (Cl. 178—23)

Figure 1:
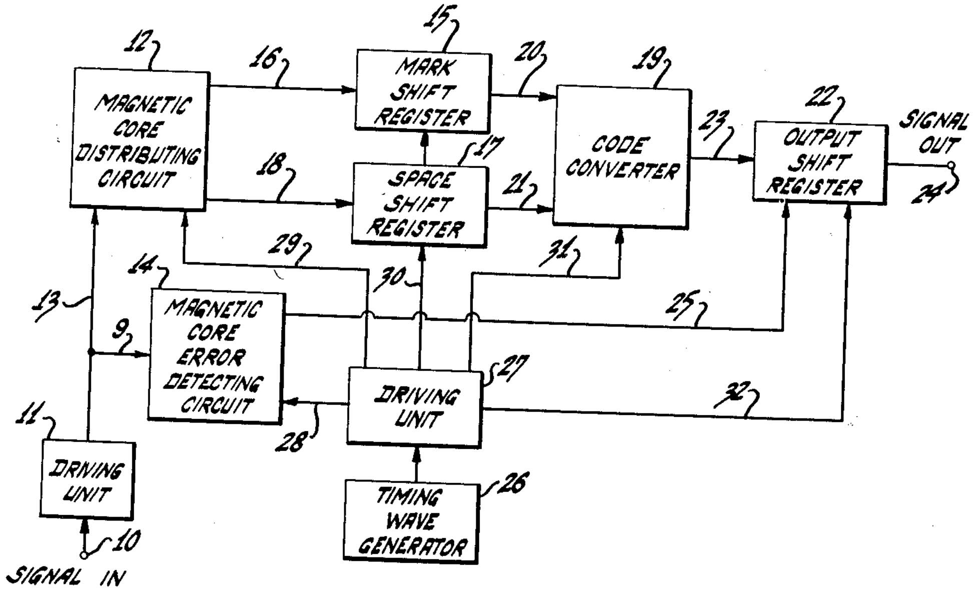

The invention relates to control circuits. More particularly, the invention relates to an electronic code converting and error detecting control circuit which can be adapted for use in a telegraph communication system.

Telegraph printing devices are designed for the most part to receive and/or transmit the code characters of a standard fixed-length telegraph code, for example, the five-unit fixed-length telegraph code. Each code character of the five-unit telegraph code includes an arrangement of marking and spacing elements. A code character may include five marking elements, five spacing elements or a combination of marking and spacing elements arranged in a predetermined manner. Marking elements are generally defined as intervals of current flow, while spacing elements are generally defined as intervals of no current flow. The transmission of a telegraph message signal between remotely located telegraph terminal stations using such a telegraph code, for example, by means of a radio frequency transmission system, has not been entirely satisfactory. Marking elements included in a code character may be deleted by atmospheric conditions, while spacing elements may be filled in by noise, and so on. As the ratio of marking elements to spacing elements is not the same in each character of the five-unit telegraph code, it is difficult to design equipment for detecting an erroneous code character which has been distorted during the transmission thereof and, thereafter, placing the necessary correcting equipment in operation.

Various telegraph codes known in the art as protected telegraph codes have been developed to remove this difficulty. The marking and spacing elements in the code characters of a protected telegraph code are arranged such that a received distorted code character can be readily detected. For example, the code characters of the seven-unit, fixed-length protected telegraph code each include a ratio of three marking elements to four spacing elements. A distorted code character including more or less than three marking elements can be detected by providing equipment for counting the marking elements in each code character as it is received, the equipment being arranged to place the necessary correcting equipment in operation upon the detection of a distorted character.

In the use of a protected telegraph code, code characters are first produced using the standard telegraph code. Equipment is provided at a telegraph transmitting terminal station for converting the code characters into the corresponding code characters of the protected telegraph code and for transmitting the converted code characters to a telegraph receiving terminal station. Equipment is provided at the receiving terminal station for converting the code characters of the protected telegraph code into the corresponding code characters of the standard telegraph code and for feeding the code characters of the standard telegraph code to an utilization circuit such as a telegraph printing device. Additional equipment is provided for checking each code character of the protected telegraph code as it is received and for placing the necessary correcting equipment in operation upon the detection of a distorted or erroneous character. The correcting equipment may function to cause the printing of a given code character in place of the distorted code character received or to cause the operation of an automatic repetition request system, whereby a code character received distorted is automatically retransmitted by the transmitting terminal station until it is correctly received at the receiving terminal station.

Circuits for performing the code converting and error detecting functions outlined above are presently available in the art. Both electronic and mechanical circuits are known. The mechanical circuits, including the use of priming windings, relays and so on, are not completely satisfactory because they create difficult mechanical maintenance problems. Such circuits tend to be complicated in construction and operation. The electronic circuits presently available require a number of vacuum tubes. While some of the problems encountered in using the mechanical circuits are eliminated by the use of the electronic circuits, the number of vacuum tubes needed in the electronic circuits now available presents the problem of heat dissipation and makes the circuits expensive to construct and maintain in terms of components and power consumption. Because of the number of vacuum tubes needed, the electronic circuits tend to be bulky and awkward to handle, thereby adding to the problems encountered in designing equipment including a code converting and error detecting circuit of this type.

It is an object of the invention to provide an improved electronic circuit for converting code characters of a given telegraph code into the corresponding code characters of a different telegraph code, including equipment for detecting the reception by the circuit of a distorted code character of the given telegraph code.

Another object of the invention is to provide a more compact, simpler and improved code converting and error detecting circuit using magnetic cores to perform functions heretofore performed by other equipment.

The objects of the invention are accomplished by a code converting and error detecting circuit using single magnetic cores and a number of magnetic core shift registers. Each of the shift registers includes a number of magnetic cores connected to form a chain or train of magnetic cores in a manner known in the art. An incoming telegraph message signal including code characters of a given telegraph code is applied from suitable receiving equipment to a distributing circuit. In describing the invention, it will be assumed that the incoming message signal includes code characters of the seven-unit telegraph code and that the circuit of the invention is required to convert the code characters of the seven-unit telegraph code into the corresponding code characters of the five-unit telegraph code. However, as will be discussed, the circuit may be designed for use with other telegraph codes without departing from the spirit of the invention.

The distributing circuit includes an arrangement of single magnetic cores and functions to distribute the signal elements included in a received code character to a pair of magnetic core shift registers which are designated as a mark shift register and a space shift register, respectively. Each code character of the seven-unit telegraph code includes three marking elements and four spacing elements. The marking and spacing elements are arranged in a predetermined order for each code character of the seven-unit telegraph code. The distributing circuit functions to establish an electrical condition in various ones of the magnetic cores in the mark shift register according to the order in which the marking elements appear in an incoming code character of the seven-unit telegraph code. The distributing circuit also functions to establish an electrical condition in various ones of the magnetic cores in the space shift register according to the order in which the spacing elements appear in the incoming code character of the seven-unit telegraph code. As a result of this action, the incoming code character is stored in the mark and space shift registers in a binary form when the mark and space shift registers are considered as a single unit.

In addition to being applied to the magnetic core distributing circuit, the incoming telegraph message signal is simultaneously applied to an error detecting circuit. The error detecting circuit includes a magnetic core shift register designated as a mutilation shift register and a single magnetic core. The error detecting circuit functions to count the number of marking elements in the incoming code character by the operation of the mutilation shift register. Each code character of the seven-unit telegraph code includes three marking elements. If more than or less than three marking elements are counted in a code character, a distorted code character has been received and is detected.

Following the establishment of an incoming code character in the mark and space shift registers in binary form and the determination of the number of marking elements in the code character by the operation of the mutilation shift register, the binary information corresponding to the incoming code character is applied from the mark and space shift registers to a code converter. The code converter which may, for example, include a diode matrix of a type known in the art, functions in response to the binary information to convert the incoming code character of the seven-unit telegraph code into the corresponding code character of the five-unit telegraph code. The converted code character is applied to an output circuit which, in turn, functions to apply the converted code character to an utilization circuit connected thereto. If the mutilation shift register has determined that the incoming code character is distorted, the single magnetic core included in the error detecting circuit is operated to apply a control signal to the output circuit. The output circuit functions to apply the control signal to the utilization circuit along with the conversion of the distorted code character received. The utilization circuit, for example, a telegraph printing device, functions to process a code character received, in the absence of a control signal received from the output circuit, in the normal manner. When a code character is received from the output circuit accompanied by a control signal, equipment included in the utilization circuit may be placed in operation to bring about the completion of certain prearranged procedures. The equipment may be included in an automatic repetition request system which functions to cause a code character of the seven-unit telegraph code originally received distorted to be retransmitted by the telegraph transmitting terminal station until it is received correctly, as indicated by the operation of the multilation shift register. A code converting and error detecting circuit is disclosed by the invention which is more compact and simpler than the code converting and error detecting circuits previously available in the art.

Figure 3:
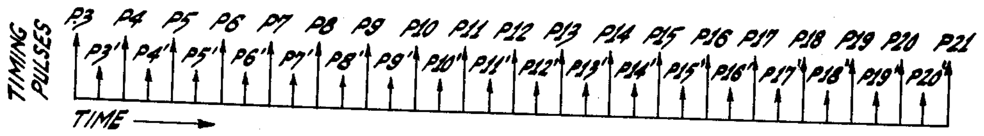
Figure 2A:
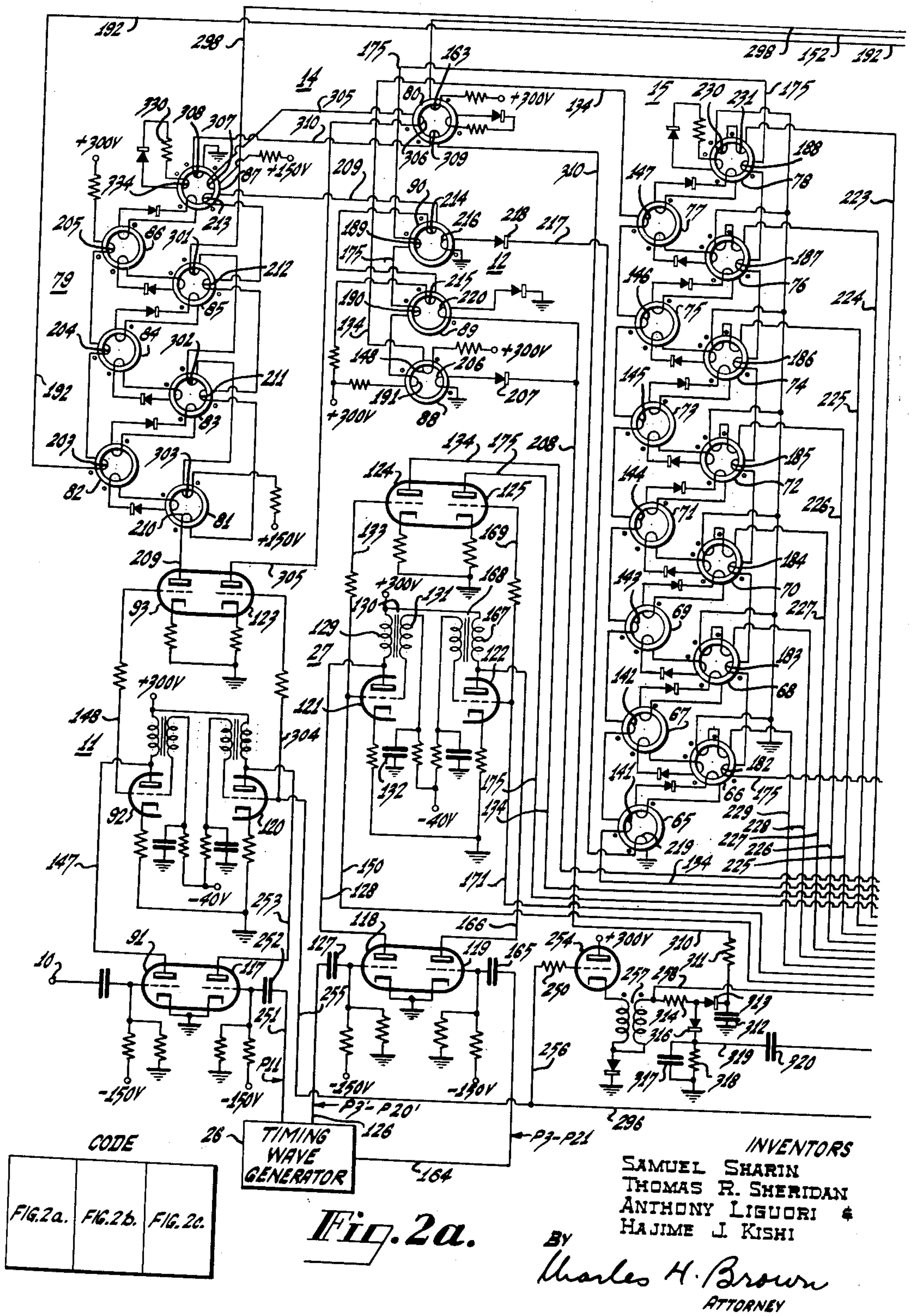
Figure 2B:
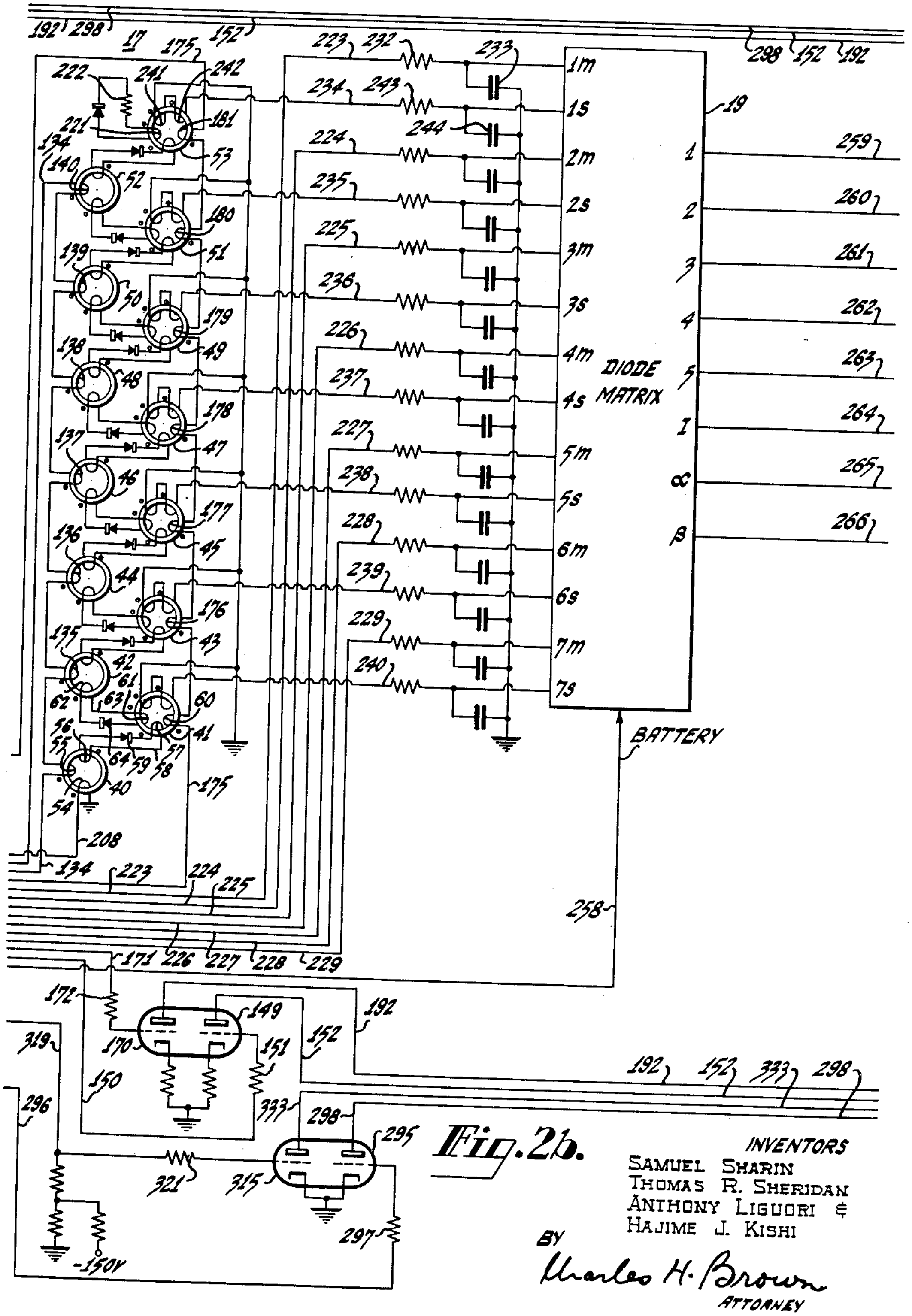
Figure 2C:
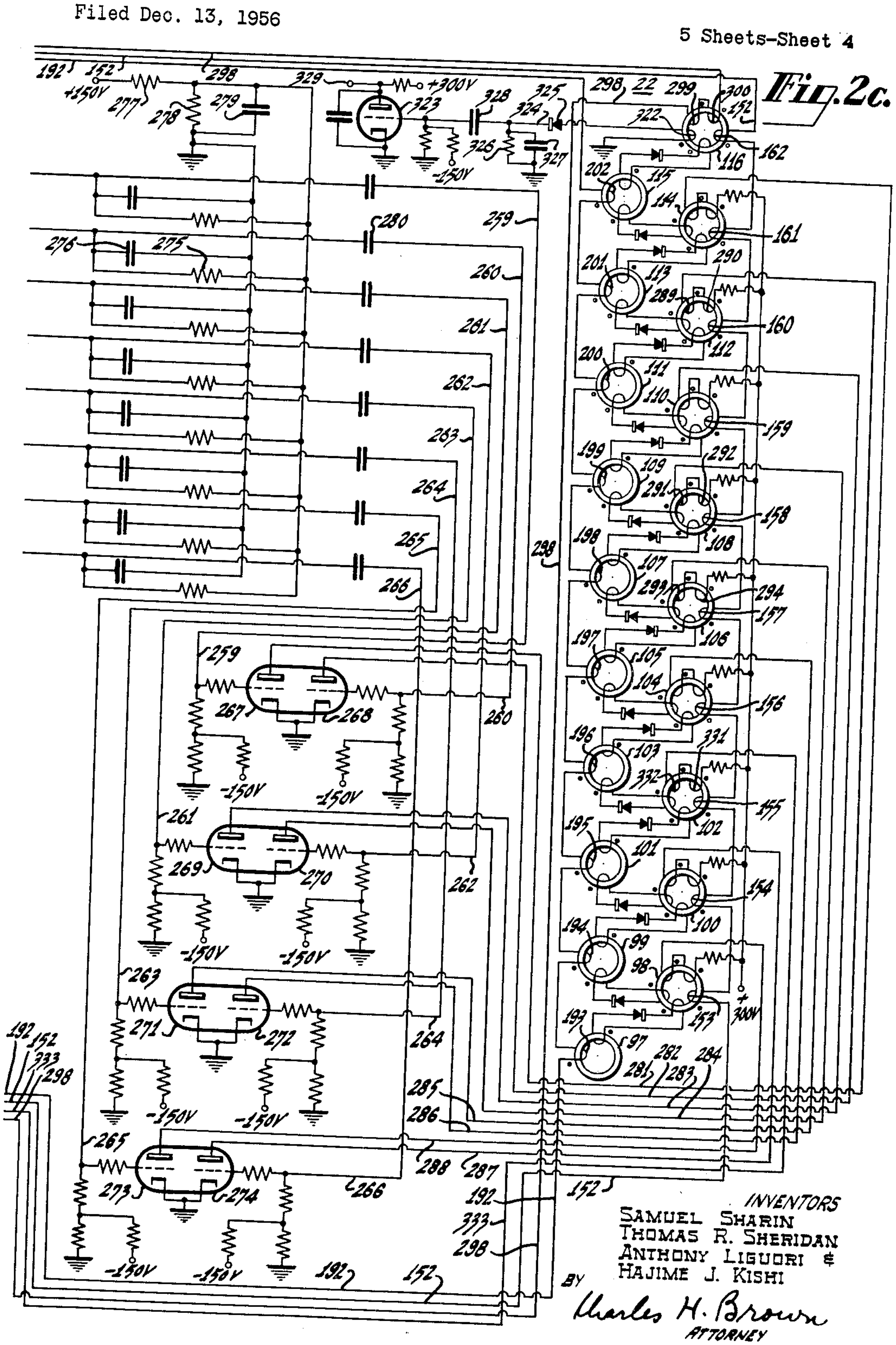
Figure 4:
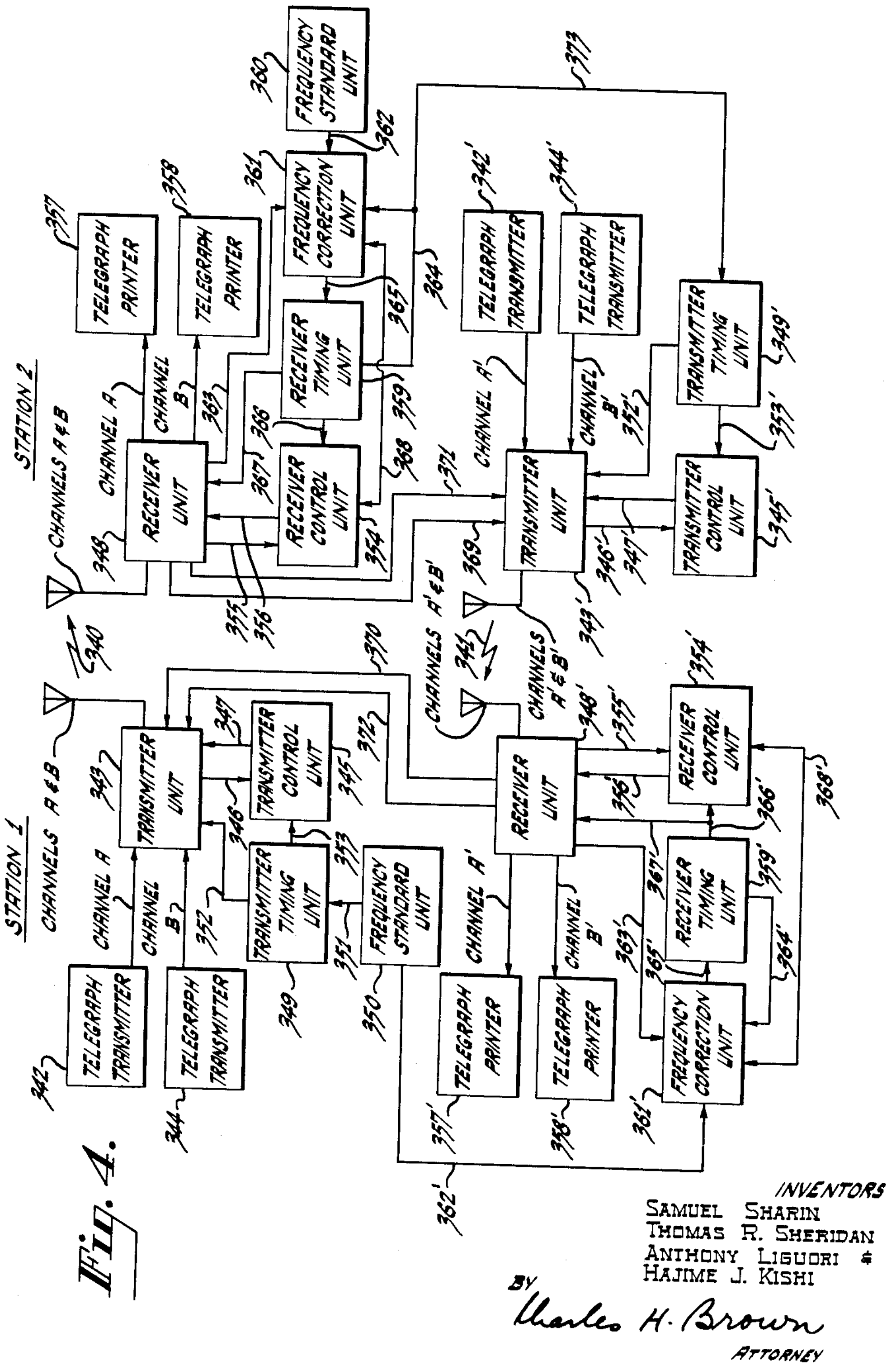

A more detailed description of the invention follows with reference to the accompanying drawing, in which:

FIGURE 1 is a block diagram of a code converting and error detecting circuit according to the invention;

FIGURES 2*a*, 2*b* and 2*c* together show a circuit diagram of one embodiment of a code converting and error detecting circuit constructed according to the arrangement of the invention shown by way of example in the block diagram of FIGURE 1;

FIGURE 3 is a timing diagram used in explaining the operation of the circuit diagram shown in FIGURE 2; and FIGURE 4 is a block diagram of an automatic telegraph communication system in which the code converting and error detecting circuit of the invention may find application.

Referring to the block diagram shown in FIGURE 1, a telegraph message signal is applied from suitable receiving equipment to an input terminal 10. The message signal is applied from the input terminal 10 to a driving unit 11. The driving unit 11 functions to apply the signal elements included in each code character of the message signal to a magnetic core distributing circuit 12 over lead 13 and to a magnetic core error detecting circuit 14 over lead 9. The magnetic core distributing circuit 12 includes a number of single magnetic cores which are interconnected so as to perform functions which will be described in detail. The magnetic core error detecting circuit 14 includes a mutilation magnetic core shift register and a single magnetic core. The operation of magnetic cores and of magnetic core shift register, per se, is known in the art, and, therefore, a detailed description thereof is unnecessary. A magnetic core is a circuit element having a rectangular hysteresis loop of low coercive force. Certain materials such as molybdenum-permalloy and manganese-magnesium ferrite exhibit a substantial rectangular hysteresis loop. Input, output and shift windings are arranged on the core. A magnetic core is capable of being magnetized to saturation in either one of two directions. In one direction, a positive or active state is said to arise in which the direction of retentivity is opposite to that which would result from the application of a shift current or sensing pulse to the shift winding of the core. In the second direction, a negative or inactive state is said to arise in which the direction of retentivity is the same as that which would result from the application of a shift current pulse to the shift winding on the core. When applied to a magnetic core in the active state, a shift current pulse will cause the inactive state to appear. When applied to a magnetic core already in the inactive state, a shift current pulse will cause no change in state. A magnetic core in the active or positive state is said to contain a "one," and a magnetic core in the negative or inactive state is said to contain a "zero." When a magnetic core is shifted from an active state to an inactive state, a voltage is induced in its output winding for application to an utilization circuit connected thereto. A shift current pulse will have no substantial effect on a magnetic core in the inactive state, and substantially no voltage will be induced in its output winding.

If a "one" is stored in a first magnetic core in a chain of magnetic cores included in a shift register such that the core is in an active state, the application of a shift current pulse to the shift winding on the core causes a voltage to be induced in the output winding on the core. The output winding on the first magnetic core is connected to the input winding on a succeeding core in the chain. The voltage induced in the output winding on the first magnetic core is applied to the input winding on the next magnetic core in the chain, causing a "one" to be stored in the next magnetic core. Thus, the "one" is transferred from the first magnetic core to a second magnetic core included in the shift register. Additional shift current pulses can be selectively applied to the magnetic cores in the chain of magnetic cores to cause the "one" to advance core-by-core along the chain of magnetic cores included in the shift register. As a result of the actions outlined above, a single magnetic core, as well as a magnetic core shift register, can be adapted to perform various functions.

In the code converting and error detecting circuit of the invention, as shown in the block diagram given in FIGURE 1, the magnetic cores included in the distributing circuit 12 function to distribute the signal elements of each seven-unit code character received to a mark shift register 15 over lead 16 and to a space shift register 17 over lead 18. Upon the reception of each marking element in a code character, a control pulse is applied from the distributing circuit 12 to the mark shift register 15 over lead 16 such that a "one" is stored in a magnetic core included therein. As a result of this action, a "one" is stored in certain of the magnetic cores included in the mark shift register 15 according to the order in which the marking elements appear in a code character received. Upon the reception of each spacing element in the code character, a control pulse is applied from the distributing circuit 12 to the space shift register 17 over lead 18 such that a "one" is stored in certain of the magnetic cores included in the space shift register 17 according to the order in which the spacing elements appear in the code character received. Upon the reception of a complete and correct code character of the seven-unit telegraph code, therefore, a "one" will be stored in three of the magnetic cores included in the mark shift register 15 over lead 16 such that a "one" is stored in a magnetic cores therein. A "one" will be stored in four of the magnetic cores included in the space shift register 17, and a "zero" will be stored in the remaining magnetic cores therein. In other words the code character received is stored in one sense in the mark shift register 15 and in the opposite sense in the space shift register 17. The code character is said to be stored in a binary form in the registers 15, 17.

As a code character is received by the distributing circuit 12 over lead 13, the signal elements included therein are applied to the error detecting circuit 14 over lead 9. The marking elements in the code character received are counted by the operation of the mutilation register included in the error detecting circuit 14. If the correct number of marking elements are counted, namely, three, no further circuit operations occur as a result of the operation of the error detecting circuit 14. The mark and space shift registers 15, 17 are operated to apply the binary information stored therein to a code converter 19 over leads 20 and 21, respectively. The code converter 19, which may, for example, include a diode matrix known in the art, functions to convert the seven-unit code character received into the corresponding code character of the five-unit telegraph code. The converted code character is applied from the code converter 19 to an output, magnetic core shift register 22 over lead 23. The shift register 22 functions to apply the code character to an utilization circuit via an output terminal 24.

If the mutilation shift register included, in the error detecting circuit 14 detects a distorted code character, that is a code character having more than or less than three marking elements, the single magnetic core included in the error detecting circuit 14 functions to apply a control signal to the shift register 22 over lead 25. The control signal is applied to the shift register 22 over lead 25 at the same time that the conversion of the distorted code character is applied from the code converter 19 thereto over lead 23. The shift register 22 functions to apply the conversion of the distorted code character along with the control signal received from the error detecting circuit 14 to the utilization circuit connected thereto via output terminal 24. The utilization circuit preferably includes equipment responsive to the reception of the control signal to first block the operation of the utilization circuit in response to the conversion of the distorted code character and, thereafter, to effect a correction of the distorted code character, and so on.

The functioning of the various circuit components included in the code converting and error detecting circuit of the invention in the manner outlined above is controlled by timing pulses supplied by a timing wave generator 26. The timing pulses produced by the operation of the generator 26 are applied to a driving unit 27. The driving unit 27 functions to supply timing pulses in the proper sequence and at the desired rates of frequency to the error detecting circuit 14 over lead 28, the distributing circuit 12 over lead 29, the mark and space shift registers 15 and 17 over lead 30, the code converter 19 over lead 31 and to the output shift register 22 over lead 32. The various circuit components are operated in the proper timed sequence in response to the timing pulses to perform the functions described.

An embodiment of the invention is shown by way of example only in the circuit diagram given in FIGURE 2. To assist in an understanding of the invention, voltage values have been assigned to various positive and negative terminals connected to suitable sources of potential and arranged in the circuit diagram. The values, however, are given only by way of example, and can be altered to meet the requirements of a particular application without departing from the spirit of the invention.

The operation of the code converting and error detecting circuit according to the invention requires two input trains of timing pulses. Referring to FIGURE 3, the first train of timing pulses includes a series of pulses P3 through P21 shown by the larger arrows. The pulses P3 through P21 occur at regular intervals, for example, at approximately 208 microsecond intervals. The second train of timing pulses includes a series of pulses P3′ through P20′ shown by the smaller arrows. The pulses P3′ through P20′ of the second train are interspersed in time between the pulses P3 through P21 of the first train such that each of the pulses P3′ through P20′ of the second train occurs between succeeding pulses P3 through P21 of the first train. The pulses P3′ through P20′ are taken to be one-half cycle behind the pulses P3 through P21 as a reference. The second train of pulses P3′ through P20′ is continuous throughout the circuit of the invention, while the first train of pulses P3 through P21 is gated to perform the logic of the circuit. The respective trains of timing pulses have been shown for simplicity of drawing and description as being supplied by a timing wave generator 26. In actual practice, one or both of the trains of timing pulses may be supplied as a function of other equipment included in a telegraph receiving terminal station of which the circuit of the invention is a part. One of the trains of pulses may be supplied as a function of a frequency correction unit connected between the timing wave generator 26 and the input circuit of the invention, the frequency correction unit functioning to synchronize the timing pulses supplied by the timing wave generator 26 with the incoming telegraph message signal. An example of a timing wave generator using magnetic cores that can be adapted for use with the code converting and error detecting circuit of the invention is given in copending United States patent application Serial Number 616,275, filed October 16, 1956 on behalf of H. J. Kishi, A. Liguori and T. R. Sheridan for Timing Circuit, now Patent No. 3,012,228, issued Dec. 5, 1961.

The embodiment of the invention shown in the circuit diagram given in FIGURE 2 includes a first magnetic core shift register 15 designated as a mark shift register and a second magnetic core shift register 17 designated as a space shift register. The space shift register 17 includes a chain of fourteen magnetic cores 40 through 53 arranged in two rows of seven magnetic cores each. The type of magnetic core shift register shown is generally referred to as a two core per bit shift register. The even numbered magnetic cores constitute a line of storage cores, while the odd numbered magnetic cores constitute a line of temporary storage cores. Input, output and shift windings are arranged on each of the magnetic cores 40 through 53. The relative polarity of the respective windings on each of the magnetic cores in the space shift register 17, as well as on the magnetic cores used elsewhere in the circuit to be described, is indicated by a dot adjacent one of the terminals thereof in accordance with the usual transformer convention.

Assuming for the moment that a current flows through the input winding 54 on the first magnetic core 40 in the space shift register 17, the negative voltage induced in the input winding 54 causes the magnetic core 40 to assume an active state having a "one" stored therein. If a shift current pulse is thereafter applied to the shift winding 55, a voltage is induced in the output winding 56. The voltage induced in the output winding 56 causes current to be applied to the input winding 57 on the next magnetic core 41 in the chain over a connection 58 including an unidirectional impedance device 59, for example, a rectifier. Various other unidirectional impedance devices are used elsewhere in the circuit. The devices are shown in FIGURE 2 and are identified in the specification as rectifiers. It is to be understood that the embodiment of the invention is not limited to the use of the particular type of device shown but that other devices known in the art which are adapted to pass current therethrough in only one direction may be used without departing from the spirit of the invention. The rectifier 59 is poled in the proper direction to permit the passage of current from the output winding 56 to the input winding 57. The magnetic core 40 assumes an inactive state having a "zero" stored therein. The second magnetic core 41 operates in response to the voltage induced in the input winding 57 to assume an active state having a "one" stored therein. Thus, the "one" is transferred or advanced from the first magnetic core 40 to the second magnetic core 41.

When a shift current pulse is applied to the shift winding 60 on the magnetic core 41, a voltage is induced in the output winding 61. Current is applied from the output winding 61 to the input winding 62 on the third magnetic core 42 in the chain over a connection 63 including a rectifier 64. Magnetic core 41 assumes an inactive state having a "zero" stored therein. The magnetic core 42 is operated in response to the voltage induced in the input winding 62 to assume an active state having a "one" stored therein. The "one" is advanced from the second magnetic core 41 to the third magnetic core 42. When the "one" is advanced out of the magnetic core 41, a voltage is also induced in the input winding 57. The rectifier 59 in the connection 58 is, however, poled in the proper direction to prevent current from being applied to the output winding 56 on the magnetic core 40. As a result, the "one" is not fed back from the second magnetic core 41 to the first magnetic core 40.

The remaining magnetic cores in the space shift register 17 are connected together and operate in the same manner as the magnetic cores 40, 41. By first applying a shift current pulse to the shift windings on the even numbered magnetic cores constituting the line of storage cores and then applying a shift current pulse to the shift windings on the odd numbered magnetic cores constituting the line of temporary storage cores, a "one" is advanced from core to core along the chain of magnetic cores. The "one" is advanced out of a magnetic core in the line of storage cores and into a magnetic core in the line of temporary storage cores. Upon the application of a shift current pulse to the shift windings on the magnetic cores in the line of temporary storage cores, the "one" is advanced out of the magnetic core in the line of temporary storage cores and into the next magnetic core in the line of storage cores, and so on.

The mark shift register 15 includes a chain of fourteen magnetic cores 65 through 78 arranged in two rows of seven magnetic cores each and is similar in construction and operation to that of the space shift register 17. The odd numbered magnetic cores constitute a line of storage cores, while the even numbered magnetic cores constitute a line of temporary storage cores. A "one" inserted in the first magnetic core 65 is advanced core-by-core along the chain of magnetic cores 65 through 78 in the same manner as described in connection with the space shift register 17.

The error detecting circuit 14 includes a mutilation shift register, indicated generally by the reference numeral 79, and a single magnetic core 80. The mutilation shift register 79 includes seven magnetic cores 81 through 87 arranged in a first row of four magnetic cores and in a second row of three magnetic cores. The operation of the mutilation shift register 79 is similar to that described, in detail, in connection with the space shift register 17. The odd numbered magnetic cores constitute a line of storage cores, while the even numbered magnetic cores constitute a line of temporary storage cores. A "one" inserted in the first magnetic core 81 is advanced core-by-core along the chain of magnetic cores 81 through 87 in response to shift current pulses applied at first to the shift windings on the line of storage cores and, thereafter, to the shift windings on the line of temporary storage cores. The distributing circuit 12 includes three single magnetic cores 88 through 90 which are connected together in a manner to be described. As previously mentioned, the distributing circuit 12 and error detecting circuit 14 are responsive to the signal elements included in a received code character which are applied thereto by a driving circuit 11. The driving circuit 11 includes a gating triode vacuum tube 91, a blocking oscillator triode vacuum tube 92 and a driving triode vacuum tube 93.

The mark and space shift registers 15, 17 function to store a received code character in binary form in response to the operation of the magnetic cores 88 through 90 in the distributing circuit 12. The binary information is applied from the respective mark and space shift registers 15, 17 to a code converter 19. The code converter 19 preferably includes a diode or rectifier matrix. Examples of this type of code converter are known in the art and need not be described in detail. One example of a code converter using a rectifier matrix which can be readily adapted for use in the circuit of the invention is shown and described in Patent Number 2,724,739, issued on November 22, 1955, to James S. Harris for Code Conversion System. The rectifier matrix functions in response to the binary information applied thereto to convert a received code character of a given telegraph code into the corresponding code character of a different telegraph code. The converted code character is applied from the code converter 19 to an output shift register 22 in a manner to be described.

The output shift register 22 includes a chain of twenty magnetic cores 97 through 116 arranged in two rows of ten magnetic cores each. As in the case of the other magnetic core shift registers included in the circuit of the invention, the operation of the output shift register 22 is similar to that described in connection with the space shift register 17. The odd numbered magnetic cores constitute a line of storage cores, while the even numbered magnetic cores constitute a line of temporary storage cores. A "one" inserted in a magnetic core of the output shift register 22 is advanced core-by-core along the chain of magnetic cores 97 through 116 in response to shift current pulses applied at first to the shift windings on the line of storage cores and, thereafter, to the shift windings on the line of temporary storage cores.

The distributing circuit 12, error detecting circuit 14, mark shift register 15, space shift register 17, code converter 19 and output shift register 22 are operated in proper time sequence in response to current pulses applied thereto from a second driving unit 27. The driving unit 27 includes gating triode vacuum tubes 117 through 119, blocking oscillator triode vacuum tubes 120 through 122 and driving triode vacuum tubes 123 through 125. Driving unit 27 functions to supply the required current pulses in response to the operation of the timing wave generator 26 in a manner to be described. In the interests of conservation of space, various ones of the triode vacuum tubes included in the circuit of the invention which are similar in construction and function may be combined in actual practice as duo-triode vacuum tubes. This construction has been shown in the drawing wherever possible.

In the operation of the invention, a first train of timing pulses of predetermined frequency including the pulses P3′ through P20′ shown by the smaller arrows in FIGURE 3 is applied from the timing wave generator 26 to the control grid of the tube 118 over an electrical path including lead 126 and coupling capacitor 127. The timing pulses may, for example, occur at approximately 208 microsecond intervals. The gating tube 118 is normally biased beyond cut off, and is rendered conducting in response to each timing pulse applied to the control grid thereof from the timing wave generator 26. During the intervals in which the tube 118 is conducting, current is caused to flow over lead 128 and through the primary winding 129 of a magnetic core transformer 130 included in the plate circuit of the blocking oscillator tube 121. A positive voltage is induced in the secondary winding 131 of transformer 130 which is applied to the control grid of tube 121, raising the potential on the control grid to a level such that tube 121 conducts. As the current through the primary winding 129 increases, the positive voltage applied to the control grid of tube 121 also increases until a point of saturation is reached. The current through the primary winding 129 stops increasing, and a positive voltage is no longer induced across the secondary winding 131. A charge on capacitor 132, built up during the time that voltage was being induced in the secondary winding 131, leaks off onto the control grid of tube 121. Tube 121 continues to conduct until the control grid goes negative with respect to the cathode. A sharp, positive pulse of a duration determined largely by the transformer magnetizing inductance and to a lesser degree by the value of capacitor 132 is produced which is applied over lead 133 from the control grid of tube 121 to the control grid of the driving tube 124. Tube 124 becomes conducting. The positive pulse applied to the control grid of tube 124 is amplified, and appears as a negative, shift current pulse in the plate circuit of tube 124. In this manner, a series of shift current pulses appears in the plate circuit of tube 124.

As each shift current pulse is produced by the operation of tube 124, current flows over an electrical path including lead 134, the shift windings 55 and 135 through 140 on the magnetic cores 40, 42, 44, 46, 48, 50 and 52, respectively, in the space shift register 17, the shift windings 141 through 147 on the magnetic cores 65, 67, 69, 71, 73, 75 and 77, respectively, in the mark shift register 15 and the input winding 148 on magnetic core 88 in the distributing circuit 12. The voltage induced in the input winding 148 upon the reception of each of the shift current pulses causes a "one" to be inserted in the magnetic core 88.

In addition to the above circuit operations, each positive pulse produced by the operation of tube 121 is applied from the control grid of tube 121 to the control grid of a driving triode vacuum tube 149 over an electrical path including lead 150 and resistor 151. Tube 149 conducts in response to each positive pulse applied to the control grid thereof from the control grid of tube 121, and a series of shift current pulses appears in the plate circuit of tube 149. As each shift current pulse is produced by the operation of tube 149, current flows over an electrical path including lead 152, the shift windings 153 through 162 on the magnetic cores 98, 100, 102, 104, 106, 108, 110, 112, 114, and 116, respectively, in the output shift register 22 and the input winding 163 on the magnetic core 80 included in the error detecting circuit 14. The voltage induced in the input winding 163 upon the reception of each shift current pulse causes a "one" to be inserted in the magnetic core 80. Therefore, a "one" is inserted in the magnetic cores 80, 88 in response to the shift current pulses produced as a result of each positive pulse appearing at the control grid of tube 121.

A second train of timing pulses including the timing pulses P3 through P21 shown by the larger arrows in FIGURE 3 is applied from the timing wave generator 26 to the control grid of the gating tube 119 over an electrical path including lead 164 and coupling capacitor 165. The timing pulses applied to the control grid of tube 119 occur at regular time intervals such that each of the timing pulses is applied to the control grid of tube 119 one half cycle at the operating frequency before a timing pulse of the first train is applied to the control grid of tube 118. Tube 119 is normally biased beyond cut off, and is rendered conducting upon the reception of each of the timing pulses supplied by the timing wave generator 26 over lead 164. During the periods in which tube 119 is conducting, current is caused to flow over lead 166 and through the primary winding 167 of a transformer 168 included in the plate circuit of the blocking oscillator tube 122. The tube 122 operates in exactly the same manner as described in connection with tube 121. A positive pulse is produced by the operation of tube 122 which is applied to the control grid of the driving tube 125 over an electrical path including lead 169. The tube 125 functions to produce a negative, shift current pulse in the plate circuit thereof for each positive pulse applied to its control grid. A series of shift current pulses appears in the plate circuit of tube 125. At the time that the above circuit operations are occurring, the positive pulses produced by the operation of tube 122 are also applied from the control grid of tube 122 to the control grid of a driving, triode vacuum tube 170 over an electrical circuit including lead 171 and resistor 172. Tube 170 is rendered conducting in response to each of the positive pulses applied to the control grid thereof such that a series of negative, shift current pulses appears in the plate circuit of the tube 170. The shift current pulses appearing in the respective plate circuits of tubes 125 and 170 will be one hundred and eighty degrees out of phase, in time relation, with the shift current pulses appearing in the respective plate circuits of tubes 124 and 149.

In describing a complete cycle of operation, it will be assumed that a "one" has been inserted in the magnetic cores 80, 88 as a result of the circuit operations outlined above in response to the application of a timing pulse P2′ from the timing wave generator 26 to the control grid of gating tube 118. While the timing pulse P2′ is not shown in FIGURE 3, it is to be understood that such a pulse P2′ will be supplied by the timing wave generator 26 to the control grid of tube 118 one half cycle at the operating frequency before the appearance of the timing pulse P3 at the control grid of tube 119. It will be further assumed that a "one" has been inserted in the magnetic core 81 and that a "zero" is stored in the remaining magnetic cores 82 through 87 of the mutilation shift register 79 by circuit operations to be described. The reception of the timing pulse P3 causes tube 119 to conduct. A negative pulse is applied from the plate of tube 119 to the plate circuit of tube 122, and tube 122 conducts. A positive pulse is applied from the control grid of tube 122 to the control grid of tube 125, causing tube 125 to produce a shift current pulse in its plate circuit. Current flows over an electrical path including lead 175, the shift windings 60 and 176 through 181 on magnetic cores 41, 43, 45, 47, 49, 51 and 53, respectively, in the space shift register 17, the shift windings 182 through 188 on the magnetic cores 66, 68, 70, 72, 74, 76 and 78, respectively, in the mark shift register 15, the shift winding 189 on magnetic core 90, the shift winding 190 on magnetic core 89 and the shift winding 191 on magnetic core 88.

At the same time, the positive pulse appearing at the control grid of tube 122 is applied to the control grid of tube 170 over lead 171, and a shift current pulse is produced in the plate circuit of tube 170. Current flows over an electrical path including lead 192, the shift windings 193 through 202 on the magnetic cores 97, 99, 101, 103, 105, 107, 109, 111, 113 and 115, respectively, in the output shift register 22 and the shift windings 203 through 205 on the magnetic cores 82, 84 and 86, respectively, in the mutilation shift register 79. The voltage induced in the shift winding 191 on the magnetic core 88 in the distributing circuit 12 causes the "one" stored in the magnetic core 88 to be advanced out of the core. Current flows over an electrical path including the output winding 206 on the magnetic core 88, rectifier 207, lead 208 and the input winding 54 on the first magnetic core 40 in the space shift register 17. A "one" is inserted in the first magnetic core 40 of the space shift register 17, while a "zero" is stored in the magnetic core 88 of the distributing circuit 12. No further circuit operations occur at this time, and the "one" stored in the magnetic core 81 and in the magnetic core 80 of the error detecting circuit 14 remain undisturbed.

In describing the operation of the invention in response to the reception of a code character, it will be assumed that the next code character in an incoming telegraph message signal is the letter character S of the seven-unit telegraph code. However, the operation will be similar to that described upon the reception of any other code character of the seven-unit telegraph code. The letter character S of the seven-unit telegraph code includes the second, fourth and sixth elements as marking and the first, third, fifth and seventh elements as spacing. The signal elements are applied in series from suitable receiving equipment to input terminal 10 such that they coincide in time with the timing pulse P3' through P20' applied to the control grid of tube 118 from the timing wave generator 26. In the cycle of operation to be described, the first signal element of the letter character S, namely, a spacing element, is applied to the input terminal 10 at the same time that the timing pulse P3' is applied to the control grid of tube 118. As the first signal element is a spacing element, that is an interval during which no current flows, no change in the status of the circuit occurs in response to the reception of the first signal element. However, the application of the timing pulse P3' to the control grid of tube 118 results in the production of a shift current pulse in the plate circuit of tube 124. Voltage is induced in the shift winding 55 on magnetic core 40 in the space shift register 17 and in the input winding 148 on magnetic core 88 in the distributing circuit 12. The "one" stored in magnetic core 40 is advanced into the magnetic core 41 of the space shift register 17, and a "one" is inserted in the magnetic core 88 in the manner previously described. A "zero" is now stored in the magnetic core 40 of the space shift register 17.

As shown in FIGURE 3, the next timing pulse P4 is, thereafter, applied to the control grid of tube 119 from the timing wave generator 26. A shift current pulse appears in the plate circuit of tube 125. Voltage is induced in the shift winding 60 on the magnetic core 41 in the space shift register 17 and in the shift windings 189, 190 and 191 on the magnetic cores 90, 89, and 88, respectively, in the distributing circuit 12. The "one" stored in the magnetic core 41 is advanced into the magnetic core 42 of the space shift register 17, while the "one" stored in the magnetic core 88 is inserted over lead 208 into the magnetic core 40.

The second signal element of the letter character S is applied to the input terminal 10 simultaneously with the appearance of the timing pulse P4' on the control grid of tube 118. The second signal element is marking and, therefore, a current pulse is applied from the terminal 10 to the control grid of gating tube 91. Tube 91 which is normally biased beyond cut-off conducts in response to the current pulse, and a negative pulse is applied from the plate circuit of tube 91 to the plate circuit of blocking oscillator tube 92 over lead 147. A positive pulse is produced by the operation of tube 92 which is applied to the control grid of driving tube 93 over lead 148. Tube 93 conducts, causing a negative, shift current pulse to appear in the plate circuit thereof. Current flows over an electrical path including lead 209, the shift windings 210 through 213 on the magnetic cores 81, 83, 85 and 87, respectively, in the mutilation shift register 79 and the input windings 214, 215 on magnetic cores 90, 89, respectively, in the distributing circuit 12. The voltage induced in the shift winding 210 on the magnetic core 81 in the mutilation shift register 79 causes the "one" stored in the magnetic core 81 to be advanced into the magnetic core 82 of the mutilation shift register 79. The voltage induced in the input windings 214, 215 on magnetic cores 90, 89, respectively, causes a "one" to be inserted into each of the magnetic cores 89, 90.

While the above circuit operations are occurring, the appearance of the timing pulse P4' on the control grid of tube 118 causes a shift current pulse to be produced in the plate circuit of tube 124. Voltage is induced in the shift windings 55, 135 on the magnetic cores 40, 42, respectively, in the space shift register 17 such that the "one" stored in the respective cores is advanced into the succeding magnetic cores in the chain thereof included in the space shift register 17. The "one" is advanced out of magnetic core 42 and into magnetic core 43, while the "one" is advanced out of magnetic core 40 and into magnetic core 41. A voltage is also induced in the input winding 148 on magnetic core 88 of the distributing circuit 12, causing a "one" to be inserted into the magnetic core 88.

The next timing pulse P5 applied to the control grid of tube 119 from the timing wave generator 26 over lead 164 causes a shift current pulse to appear in the plate circuit of tube 125. The "one" stored in each of the magnetic cores 41, 43 of the space shift register 17 is advanced into the succeeding magnetic cores 42, 44, respectively, in the chain thereof. A voltage is induced in the shift windings 189, 190 and 191 on the magnetic cores 90, 89 and 88, respectively, in the distributing circuit 12 over lead 175. The "one" is advanced out of the magnetic core 90 and into the first magnetic core 65 in the mark shift register 15 over an electrical path including output winding 216 on magnetic core 90, lead 217, rectifier 218 and the input winding 219 on the magnetic core 65. The voltage induced in the shift windings 190, 191 on magnetic cores 89, 88, respectively, causes a "one" to be advanced out of the respective cores at the same time. The output winding 220 on the magnetic core 89 is connected in parallel with the output winding 206 on the magnetic core 88 with respect to ground. The terms ground, as used in the specification, is to be understood as refering to a point of fixed reference potential. As indicated by the location of the dots adjacent the respective windings 220, 206, the current flowing through one of the output windings is of a polarity opposite to that flowing through the other output winding. In other words, the output of the magnetic core 89 is phased in the opposite sense with respect to ground as compared to the output of the magnetic core 88. By alternating current transformer theory, the flux linkages cancel one another such that the net output of the two magnetic cores with respect to ground is substantially zero. No effective energy is applied to the input winding 54 on the magnetic core 40 of the space shift register 71 over lead 208 and a "one" is not inserted in the magnetic core 40.

At the time of the timing pulse P5, a shift current pulse also appears in the plate circuit of tube 170. A voltage is induced in the shift winding 203 on the magnetic core 82 in the mutilation shift register 79 over lead 192. The "one" is advanced out of the magnetic core 82 and into the succeeding magnetic core 83 in the chain. At this time, therefore, a "one" is stored in the magnetic core 44 in response to the reception of the timing pulse P2' and in the magnetic core 42 of the space shift register 17 representing the first signal element, a spacing element. A "one" is stored in the magnetic core 65 of the mark shift register 15 representing the second signal element, a marking element. In addition, the "one" in the mutilation shift register 79 is now stored in the magnetic core 83, indicating that one marking element in the letter character S has been counted.

The circuit operations which follow upon the reception of the third through seventh signal elements in the letter character S are similar to those described. Upon the reception of a spacing element, a "one" is inserted in the first magnetic core 40 of the space shift register 17. Upon the reception of a marking element, a "one" is inserted in the first magnetic core 65 of the mark shift register 15, a cancellation of the outputs of the other magnetic cores 89, 88 in the distributing circuit 12 taking place such that the magnetic core 40 retains its status in which a "zero" is stored therein. Thus, the reception of the third signal element, a spacing element, and of the timing pulses P5′, P6 results in a "one" being stored in the magnetic cores 46, 44 and 40 of the space shift register 17. The "one" originally stored in magnetic core 65 is advanced first into magnetic core 66 and, thereafter, into the magnetic core 67 of the mark shift register 15. Upon the reception of the fourth signal element, a marking element, and of the timing pulses P6′, P7, a "one" is stored in the magnetic cores 48, 46 and 42 of the space shift register 17. A "one" is stored in the magnetic cores 69, 65 of the mark shift register 15. In addition, the "one" stored in the magnetic core 83 will be first advanced into the magnetic core 84 and, thereafter, into the magnetic core 85 of the mutilation register 79, indicating that the second marking element in the letter character S has been counted.

Following the reception of the fifth signal element, a spacing element, and of the timing pulses P7′, P8, a "one" is stored in the magnetic cores 50, 48, 44, 40 of the space shift register 17, while a "one" is stored in the magnetic cores 71, 67 of the mark shift register 15. The reception of the sixth signal element, a marking element, and of the timing pulses P8′, P9 causes a "one" to be stored in the magnetic cores 52, 50, 46 and 42 of the space shift register 17, and a "one" to be stored in the magnetic cores 73, 69 and 65 of the mark shift register 15. The "one" stored in the magnetic core 85 is first advanced into the magnetic core 86 and, thereafter, into the magnetic core 87 of the mutilation shift register 79, indicating that the third marking element in the letter character S has been counted. The reception of the seventh and final signal element, a spacing element, and of the timing pulses P9′, P10 causes a "one" to be stored in the magnetic cores 52, 48, 44 and 40 of the space shift register 17, representing the first, third, fifth and seventh signal elements of the letter character S as spacing. A "one" is stored in the magnetic cores 75, 71 and 67 of the mark shift register 15, representing the second, fourth and sixth signal elements of the letter character S as marking.

Referring to the space shift register 17, the output winding 221 on the last magnetic core 53 in the chain of magnetic cores therein is series connected with a terminating resistor 222. As a "one" is advanced out of the magnetic core 53, it is, therefore, terminated across the resistor 222. For example, the "one" originally inserted in the space shift register 17 upon the reception of the timing pulse P2′ is advanced out of the magnetic core 53 and terminated across the resistor 222 upon the reception of the timing pulse P10. In this manner, any information in the form of a "one" stored in one or more of the magnetic cores 40 through 53 prior to the reception of the letter character S is completely cleared out of the space shift register 17 when all of the signal elements in the letter character S are received. The only information stored in the space shift register 17 following the reception of the timing pulse P10 will be that corresponding to the arrangement of spacing elements in the letter character S. A "one" is stored in the magnetic cores 52, 48, 44 and 40, the remaining magnetic cores in the space shift register 17 having a "zero" stored therein. The construction and operation of the mark shift register 15 is similar to that described in connection with the space shift register 17. The only information stored in the mark shift register 15 following the reception of the timing pulse P10 will be that corresponding to the arrangement of marking elements in the letter character S. A "one" is stored in the magnetic cores 75, 71 and 67, the remaining magnetic cores in the mark shift register 15 having a "zero" stored therein.

For each signal element received, therefore, a "one" is stored in a magnetic core of either the mark shift register 15 or the space shift register 17 but not both. Since a "one" is inserted in the first magnetic core 65 and advanced through the mark shift register 15 for each marking element received, the magnetic cores having a "one" stored therein are arranged in the mark shift register 15 according to the order in which the marking elements appear in the incoming code character. Since a "one" is inserted in the first magnetic core 40 and advanced through the space shift register 17 for each spacing element received, the magnetic cores having a "one" stored therein are arranged in the space shift register 17 according to the order in which the spacing elements appear in the incoming code character. The code character, namely, the letter character S in the example given, is established in the mark and space shift registers 15, 17, respectively, in binary form during the interval of time between the timing pulses P3′ through P10 shown in FIGURE 3. Upon the reception of the timing pulse P10′, the "one" stored in each of the magnetic cores 52, 48, 44 and 40 is advanced into the magnetic cores 53, 49, 45 and 41, respectively, of the space shift register 17. The "one" stored in each of the magnetic cores 75, 71 and 67 is advanced into the magnetic cores 76, 72 and 68, respectively, of the mark shift register 15.

To review, a "one" is now stored in the magnetic core 87, indicating that three marking elements have been counted, and in the magnetic core 80 of the error detecting circuit 14. In this connection, it should be noted that the "one" stored in the magnetic core 80 will be reinforced upon the appearance of each shift current pulse in the plate circuit of tube 149. The binary information corresponding to the received letter character S stored in the mark and space shift registers 15, 17, respectively, is ready for application to the diode matrix 19. Each of the temporary storage magnetic cores 78, 76, 74, 72, 70, 68 and 66 in the mark shift register 15 is connected over identical electrical circuits including leads 223 through 229, respectively, to separate input terminals 1M through 7M of the diode matrix 19. For example, an electrical circuit is completed from the magnetic core 78 to the input terminal 1M including output windings 230, 231, lead 223, resistor 232 and capacitor 233 by-passed to ground, and so on. Each of the temporary storage magnetic cores 53, 51, 49, 47, 45, 43 and 41 in the space shift register 17 is connected over similar electrical circuits including leads 234 through 240, respectively, to the input terminals 1S through 7S of the diode matrix 19. Thus, the magnetic core 53 is connected to input terminal 1S over an electrical circuit including output windings 241, 242, lead 234, resistor 243 and capacitor 244 by-passed to ground, and so on. It is clear that, as the shift current pulses appearing in the plate circuit of tube 125 are applied to the shift windings on the temporary storage cores in the respective shift registers 15, 17 upon the reception of the timing pulses P3 through P10, a parallel output is obtained which is presented to the input terminals 1M through 7S of the diode matrix 19. The output will vary as the information in the form of "ones" representing the signal elements received is advanced core-by-core along the chains of magnetic cores in the respective shift registers 15, 17. The diode matrix 19, however, is controlled such that it cannot accept the signal energy applied to the input terminals 1M through 7S unless and until a battery is connected thereto. The battery is supplied to the diode matrix 19 only at the time of the timing pulse P11, and, therefore, the diode matrix 19 remains inoperative in response to the parallel output of the shift registers 15, 17 while the incoming letter character S is being established in the shift registers 15, 17 in binary form.

The application of the timing pulse P11 from the timing wave generator 26 to the control grid of tube 119 over lead 164 causes a shift current pulse to appear in the plate circuit of tube 125. The "ones" stored in the magnetic cores 76, 72 and 68 of the mark shift register 15 are advanced out of the respective magnetic cores such that a current pulse is applied to the input terminals 2M, 4M and 6M of the diode matrix 19 over leads 224, 226 and 228, respectively. At the same time, the "ones" stored in the magnetic cores 53, 49, 45 and 41 of the space shift register 17 are advanced out of the respective magnetic cores such that a current pulse is applied to the input terminals 1S, 3S, 5S and 7S of the diode matrix 19 over leads 234, 236, 238 and 240, respectively. The input terminals 1M through 7S are paired such that each pair includes a marking terminal and a spacing terminal. Seven pairs of terminals are provided each representing a signal element included in an incoming code character. A current pulse is applied to one of the terminals in each pair depending upon whether the corresponding signal element is marking or spacing. The letter character S includes the first, third, fifth and seventh elements as spacing and the second, fourth and sixth elements as marking. Therefore, a current pulse is applied in the example given to the input terminals 1S, 2M, 3S, 4M, 5S, 6M and 7S of the diode matrix 19.

Simultaneously with the application of the timing pulse P11 to the control grid of tube 119, the timing wave generator 26 functions to apply the timing pulse P11 to the control grid of the gating tube 117 over an electrical circuit including lead 251 and coupling capacitor 252. A negative pulse is applied from the plate of tube 117 to the plate circuit of blocking oscillator tube 120 over lead 253. The tube 120 functions to produce a positive pulse which is applied from the control grid of tube 120 to the control grid of a cathode follower tube 254 over an electrical circuit including lead 255, lead 256 and resistor 250. A positive pulse is applied from the cathode of tube 254 to the diode matrix 19, as battery, over an electrical circuit including a current boosting transformer 257 and lead 258. The diode matrix 19 thereupon functions to convert the binary information received representing the letter character S of the seven-unit telegraph code into the letter character S of the five-unit code. The operation of the diode matrix 19 is similar to that described in detail in Patent Number 2,724,739 issued on November 22, 1955, to J. S. Harris for Code Conversion System, and need not, therefore, be described in detail at this time. The diode matrix 19, per se, forms no part of the instant invention.

The letter character S in the five-unit telegraph code includes the first and third elements as marking, while the second, fourth and fifth elements are spacing. The diode matrix 19 is designed to supply a current pulse at the respective output terminals thereof for each spacing element and no current pulse at the respective output terminals thereof for each marking element. A current pulse will, therefore, appear at the output terminals 2, 4 and 5. In addition to the five numbered signal element output terminals, the diode matrix 19 includes the output terminals labeled Signal I, Alpha and Beta. A current pulse appears at one of the last-mentioned output terminals in response to the reception by the diode matrix 19 of a corresponding control function character of the seven-unit telegraph code. The respective output terminals of the diode matrix 19 are connected over identical circuits including leads 259 through 266 to the control grids of separate gating triode vacuum tubes 267 through 274, respectively. In the example given, a current pulse is applied from the output terminal 2 of the diode matrix 19 to the control grid of tube 268 over the electrical circuit including an integrating network comprising resistor 275 and capacitor 276, a back-biasing network including resistors 277, 278 and capacitor 279, coupling capacitor 280 and lead 260. A current pulse is also applied from the output terminals 4 and 5 to the respective control grids of tubes 270, 271 over similar electrical circuits including leads 262, 263, respectively.

The gating tubes 267 through 274 are normally biased beyond cut-off. Upon the application of the current pulses to the control grids thereof, tubes 268, 270, 271 conduct. The respective plates of tubes 267 through 274 are connected to input windings on the magnetic cores 114, 112, 110, 108, 106, 104, 100, 98 of the output shift register 22 over leads 281 through 288 respectively.

When one or more of the gating tubes 267 through 274 is rendered conducting by the application of a current pulse to the control grid thereof from the diode matrix 19, a negative, current pulse is applied from the plate circuit of the conducting tube to the input winding on the magnetic core in the output shift register 22 to which it is connected. In the example given, tubes 268, 270, 271 conduct. A current pulse is applied from the plate circuit of tube 268 to the input windings 289, 290 on the magnetic core 112 of the output shift register 22 over lead 282. A current pulse is also applied from the plate circuit of tube 270 to the input windings 291, 292 on the magnetic core 108 of the output shift register 22 over lead 284. In addition, a current pulse is applied from the plate circuit of tube 271 to the input windings 293, 294 on the magnetic core 106 of the output shift register 22 over lead 285. A "one" is inserted in the magnetic cores 112, 108 and 106 of the output shift register 22.

While the above circuit operations are occurring, the positive pulse appearing at the control grid of tube 120 is applied to the control grid of a driving triode vacuum tube 295 over an electrical path including lead 255, lead 296 and resistor 297. Tube 295 conducts such that a negative, current pulse is applied from the plate circuit of tube 295 to the positive terminal of a source of potential over an electrical circuit including lead 298, the input windings 299, 300 on the magnetic core 116 of the output shift register 22 and the input windings 301 through 303 on the magnetic cores 85, 83, and 81, respectively, in the mutilation shift register 79. A "one" is inserted in the magnetic core 116 of the output shift register 22. The polarity of the input windings 301, 302 is such that the status of the magnetic cores 85, 83, respectively, having a "zero" stored therein, is confirmed. The polarity of the input winding 303 on the magnetic core 81 is determined such that a "one" is inserted in the magnetic core 81. The "one" will remain stored in the magnetic core 81 of the mutilation shift register 79 until the next code character is received. At that time a new count of the marking elements included in the subsequent code character will be made, causing the "one" to be advanced out of the magnetic core 81 and along the chain of magnetic cores in the mutilation shift register 79 in the manner described above.

In addition to the above circuit operations, the timing pulse P11 performs still another function. A "one" is at this itme stored in the single magnetic core 80 and in the last magnetic core 87 of the mutilation shift register 79 in the error detecting circuit 14. As described above, the application of the timing pulse P11 to the control grid of tube 117 from the timing wave generator 26 over lead 251 causes a positive pulse to be produced by operation of tube 120. The positive pulse is applied from the control grid of tube 120 to the control grid of driving tube 123 over lead 304. A shift current pulse appears in the plate circuit of tube 123. Current flows over an electrical circuit including lead 305, the shift winding 306 on magnetic core 80 and the shift winding 307 on magnetic core 87, causing the "ones" to be advanced out of the respective magnetic cores 80, 87. The output windings 308, 309 on the magnetic cores 87, 80, respectively, are series connected, and are mounted on the respective magnetic cores 87, 80 such that the output of the magnetic core 87 is opposite in phase with respect to ground as compared to the output of the magnetic core 80. The net flux linkages of the two magnetic cores 87, 80 becomes substantially zero.

The shift windings 308, 309 are included in an electrical circuit forming a load for the cathode follower tube 254, the electrical circuit also including lead 310, resistor 311, capacitor 312 by-passed to ground, rectifier 313, resistor 314 and the current boosting transformer 257. The junction of the resistor 314 and rectifier 313 is connected to the control grid of a driving triode vacuum tube 315 over an electrical circuit including rectifier 316, a network including resistor 318 and capacitor 317, lead 319, coupling capacitor 320 and resistor 321. As will be discussed, the tube 315 functions to insert a "one" in the mutilation magnetic core 102 of the output shift register 22 when a mutilated or erroneous character is detected by the error detecting circuit 14. It has been assumed so far, however, that three marking elements have been counted by the mutilation shift register 79 indicating the reception of a proper code character. In this situation, the cancellation of the flux linkages by the simultaneous advancement of a "one" out of the magnetic cores 80, 87 effectively produces a ground connection such that current flows over the electrical circuit including resistor 314, rectifier 313, capacitor 312 by-passed to ground, resistor 311, lead 310 and the shift windings 309, 308 on the magnetic cores 80, 87, respectively. A positive pulse is not applied to the control grid of tube 315. Tube 135 which is normally biased beyond cut-off remains quiescent, and a "one" is not inserted into the mutilation magnetic core 102 of the output shift register 22.

The letter character S of the five-unit telegraph code is now ready to be advanced out of the output shift register 22 and applied to a utilization circuit. Upon the application of the timing pulse P11′ to the control grid of tube 118, a shift current pulse appears in the plate circuit of tube 149. Current flows over the electrical circuit including lead 152, the shift windings 162, 160, 158 and 157 on the magnetic cores 116, 112, 108 and 106, respectively, of the output shift register 22 and the input winding 163 on the magnetic core 80 of the error detecting circuit 14. A "one" is inserted into the magnetic core 80 and is reinforced upon the appearance of each subsequent shift current pulse in the plate circuit of tube 149 in the manner already described. The "ones" stored in the magnetic cores 116, 112, 108 and 106 are advanced out of these magnetic cores and into the succeeding magnetic cores in the chain thereof in the output shift register 22 such that a "one" is stored in the magnetic cores 113, 109 and 107. It will be remembered that a "one" was stored in the last magnetic core 116 of the output shift register 22 upon the reception of the timing pulse P11. A voltage is induced in the output winding 322 on the magnetic core 116 such that a positive pulse is applied to the control grid of a gating triode vacuum tube 323 over an electrical circuit including lead 324, rectifier 325, a network connected to ground including resistor 326 and capacitor 327 and coupling capacitor 328. Tube 323 which is normally biased beyond cut-off conducts. As a result, an interval of no current flow or spacing element appears at the output terminal 329. This spacing element is designated as the start element for the five-unit code character to follow.

The following circuit operations can be determined from the description already given. Current will flow through the shift windings 193 through 202 on the magnetic cores 97, 99, 101, 103, 105, 107, 109, 111, 113 and 115 upon the application of each of the timing pulses P12, P13, P14, P15, P16, P17, P18, P19 and P20 from the timing wave generator 26 to the control grid of tube 119. Current will flow through the shift windings 153 through 162 on the magnetic cores 98, 100, 102, 104, 106, 108, 110, 112, 114, and 116 upon the application of each of the timing pulses P12′, P13′, P14′, P15′, P16′, P17′, P18′, P19′, and P20′ to the control grid of tube 118 from the timing wave generator 26. The letter character S represented by a "one" and by the absence of a "one" stored in certain of the magnetic cores in the output shift register 22 is advanced core-by-core such that it is cleared out of the output shift register 22. Upon the reception of the timing pulse P12′, no voltage is induced in the output winding 322 on the magnetic core 116, tube 323 remains cut-off and an interval of current flow or marking element appears at the output terminal 329; upon the reception of timing pulse P13′, voltage is induced in the output winding 322, tube 323 conducts and an interval of no current flow or spacing element appears at the output terminal 329; upon the reception of the timing pulse P14′, no voltage is induced in the output winding 322, tube 323 remains cut-off and an interval of current flow or marking element appears at output terminal 329; and upon the reception of the timing pulses P15′, P16′, voltage is induced in the output winding 322, tube 323 conducts and two successive intervals of no current flow or spacing elements appear at the output terminal 329. The letter character S of the five-unit telegraph code comprising the first or start element as spacing, the first and third signal elements as marking and the second, fourth and fifth signal elements as spacing appears at the output terminal 329 for application to a utilization circuit.

The circuit operations which occur upon the reception of any correct code character of the seven-unit telegraph code are the same as outlined above. The code character is received, converted and applied to the output terminal 329, the error detecting circuit 14 functioning to determine that the incoming code character includes three marking elements. If the control function character Signal I of the seven-unit telegraph code is received, the diode matrix 19 functions to insert a "one" in the magnetic core 104 of the output shift register 22 by causing tube 272 to conduct in response to a pulse applied to the control grid thereof over lead 264. Tube 273 is made to conduct upon the reception of the control function character Alpha of the seven-unit telegraph code, and a "one" is inserted in the magnetic core 98 of the output shift register 22. The reception of the control function character Beta of the seven-unit telegraph code causes tube 274 to conduct, and a "one" is inserted in the magnetic core 100 of the output shift register 22. As there is, in effect, no conversion to a five-unit code character upon the reception of the three last-mentioned code characters of the seven-unit telegraph code, current pulses will not appear on any of the signal output terminals 1 through 5 in these instances. A "one" will be stored in the start magnetic core 116 and in only one of the other magnetic cores 97 through 115 in the output shift register 22, depending upon which of the control function characters Signal I, Alpha or Beta of the seven-unit telegraph code has been received. When the output shift register 22 is cleared of the information stored therein, a control pulse will appear at the output terminal 329 at a time determined according to which one of magnetic cores 104, 100 or 98 has had a "one" stored therein. The utilization circuit or equipment connected to the output terminal 329 can be designed to operate in response to the control pulse to perform the function desired.

The description has been directed up to this point to the operation of the invention upon the reception of a correct code character of the seven-unit telegraph code, that is a code character including three marking elements. When a distorted code character of the seven-unit telegraph code is received, that is a code character including more than or less than three marking elements, the code character is stored in the mark and space shift registers 15, 17, respectively, in the manner outlined above. As the signal elements are received, the marking elements are counted by the mutilation shift register 79. If the incoming code character includes no marking elements, the "one" remains stored in the magnetic core 81 of the mutilation shift register 79. If only one marking element is received, the "one" is advanced out of the magnetic core 81 and into magnetic core 83. If two marking elements are counted, the "one" is advanced out of the magnetic core 81 and into the magnetic core 85. If more than three marking elements are counted, the "one" is completely cleared out of the mutilation shift register 79 such that a "zero" is stored in each of the magnetic cores 81 through 87. When the fourth marking element is received, a voltage will be induced in the output winding 334 on the magnetic core 87. The "one" stored in the magnetic core 87 at this time is advanced out of the magnetic core 87 and terminated across a resistor 330. As a result, a "one" is no longer stored in any of the magnetic cores 81 through 87 and can not, therefore, be advanced through the mutilation shift register 79 upon the reception of additional marking elements.

If a code character is received including more than or less than three marking elements, therefore, a "one" will not be stored in the last magnetic core 87 of the mutilation shift register 79 at the time of the timing pulse P11. When the timing pulse P11 is received, the binary information corresponding to the distorted code character received will be advanced out of the mark and space shift registers 15, 17, respectively, and into the diode matrix 19. A "one" is inserted into the magnetic core 116 of the output shift register 22. A shift current pulse appears in the plate circuit of tube 123 such that current flows over the electrical circuit including lead 305, the shift winding 306 on magnetic core 80 and the shift winding 307 on the magnetic core 87. The "one" stored in the magnetic core 80 is advanced out of magnetic core 80 such that a voltage is induced in the output winding 309. As a "zero" is stored in the magnetic core 87, no voltage is induced in the output winding 308 on the magnetic core 87. No cancellation of flux linkages occurs, and the output of the magnetic core 80 is phased with respect to ground such that current flow over the electrical circuit including lead 310, resistor 311, capacitor 312 by-passed to ground and resistor 314 is blocked.

The application of the battery pulse to the diode matrix 19 over lead 258 by the operation of tube 254 causes a positive pulse to be applied to the control grid of tube 315 over the electrical circuit including rectifier 316, the network including resistor 318 and capacitor 317, lead 319, coupling capacitor 320 and resistor 321. Tube 315 conducts, and a current pulse is applied from the plate circuit of tube 315 to the input windings 331, 332 on the core 102 of the output shift register 22 over lead 333. A "one" is stored in the magnetic core 102.

In this connection, it should be noted that the tube 315 can conduct only at the time of the timing pulse P11 by the application of the battery pulse to the diode matrix 19. This prevents tube 315 conducting in a situation where more than three marking elements are counted by the multilation shift register 19, causing a voltage to be induced in the output winding 308 on magnetic core 87 at a time prior to the reception of the timing pulse P11. As a result of this action, a "one" would otherwise be inserted in the magnetic core 102 of the output shift register 22 at the wrong time in the sequence of operation, disrupting the proper operation of the invention.

The conversion of the distorted code character received is applied from the output terminals 1 through 5 to the magnetic cores 114, 112, 110, 108 and 106. The diode matrix 19 is preferably designed such that a current pulse will not appear at any of the output terminals Signal I, Alpha or Beta upon the reception of a distorted code character. The information stored in the output shift register 22 is, thereafter, applied to the utilization equipment via output terminal 329 in the form of a start element, the conversion of the distorted character followed in time by a control pulse, indicating that a distorted code character has been received. The utilization equipment includes equipment design to produce a desired function in response to the control pulse. For example, an automatic repetition request system may be placed in operation such that the conversion is ignored and the telegraph transmitting terminal station is automatically requested to repeat the transmission of the code character originally received distorted.

At the time of the timing pulse P11, current is applied to the shift windings 301 through 303 on the magnetic cores 85, 83, and 81, respectively. A "one" is either inserted in the magnetic core 81 or the presence of a "one" therein is confirmed in the case where a code character previously received included no marking elements. A "one" stored in the magnetic core 83 or in the magnetic core 85 is advanced out of the respective magnetic cores such that a "zero" is stored therein. Normally, a "one" advanced out of magnetic core 83 would be inserted in magnetic core 84, while a "one" advanced out of magnetic core 85 would be inserted in magnetic core 86. However, at the time that timing pulse P11 is received, tube 170 conducts. Current also flows over the electrical circuit including lead 192 and the shift windings 203 through 205 on the magnetic cores 82, 84 and 86, respectively. This action prevents a "one" from being inserted into any of the magnetic cores 82, 84 and 86. A "one" is, therefore, inserted in magnetic core 81, and the remaining magnetic cores 82 through 87 in the mutilation shift register 79 are each made to have a "zero" stored therein. At the time of the timing pulse P11', a "one" is inserted into the magnetic core 80 of the error detecting circuit 14.

A complete cycle of operation has been described. Referring to FIGURE 3, the seven-unit code character is received upon the reception of the timing pulses occurring during the time interval between the timing pulse P3 and the timing pulse P10'. At the time of the timing pulse P11, the conversion of the received code character takes place, and the number of marking elements counted in the received code character is checked, including the insertion of a "one" into the magnetic core 102 of the output shift register 22 if a distorted code character is detected. The conversion plus the mutilation signal, if present, is applied to the utilization equipment via output terminal 329 upon the reception of the timing pulses occurring during the time interval between the timing pulse P11' and the timing pulse P20'. Attention is called to the fact that the mark and space shift registers 15, 17, respectively, will be cleared of the information stored therein corresponding to the code character received during this later time interval. At the end of a cycle of operation, a "one" is stored in the magnetic core 80 and in the magnetic core 81 included in the mutilation shift register 79 of the error detecting circuit 14. The circuit of the invention is ready to receive and process the next code character of an incoming telegraph message signal.

It was stated earlier in the description by way of example that the timing pulses included in the respective trains thereof supplied by the timing wave generator 26 might be 208 microseconds apart in time. Following this example, it may be seen, therefore, that a complete cycle of operation would require only 3.536 milliseconds. While the invention has been described in connection with the conversion of code characters of the seven-unit telegraph code into corresponding code characters of the five-unit telegraph code, the invention may be used in other applications using different fixed-length telegraph codes without departing from the spirit thereof. The adaption of the invention for use in such other applications would only require a corresponding change in the timing sequence involving engineering skill, an adjustment of the number of magnetic cores in the various shift registers, and so on.

A functional block diagram of a telegraph communication system in which the code converting and error detecting circuit of the invention may find application is shown in FIGURE 4. The telegraph communication system shown is an automatic error correction system. The communication system includes at least two stations 1 and 2 which are electrically connected together over different electrical paths 340, 341 for two way communication. Code characters are produced by the operation of a telegraph transmitter 342 at the first station 1 for transmission over a channel A to a transmitter unit 343. Code characters are also produced by the operation of a second telegraph transmitter 344 for transmission over a second channel B to the transmitter unit 343. Each code character transmitted over channel A and over channel B includes five signal elements arranged according to the fixed-length, five-unit telegraph code. In addition, start and other control information is forwarded to the transmitter unit 343 over the respective channels A and B.

The five-unit code characters, which may each include, for example, signal elements transmitted over the respective channels A, B in parallel form, are received in order by the transmitter unit 343 and are applied, in turn, from the transmitter unit 343 to a transmitter control unit 345 over lead 346. The transmitter control unit 345 functions to convert the five-unit code characters into seven-unit code characters. The converted code characters are thereafter applied from the transmitter control unit 345 back to the transmitter unit 343 over lead 347. The transmitter unit 343 is operated to transmit the converted code characters appearing on channels A, B over the electrical path 340 to the receiver unit 348 at the second station 2 in multiplex fashion. As the code characters are transmitted over the electrical path 340, equipment is provided in the transmitter unit 343 for storing on a continuous basis the last three code characters transmitted over channel A and the last three code characters transmitted over channel B.

In order to accomplish the transmission of the code characters over channels A, B, the transmitter unit 343 and transmitter control unit 345 must operate in a predetermined time sequence. Thus, the code characters are first received in order over the channels A, B by the transmitter control unit 345. The transmitter control unit 345 operates to convert the code characters and to apply the converted code characters back to the transmitter unit 343. The transmitter unit 343 thereafter operates to transmit the converted code characters in multiplex fashion over the electrical path 340. A transmitter timing unit 349 is provided which is operated in response to signal energy of a predetermined frequency applied to the transmitter timing unit 349 from a frequency standard unit 350 over lead 351. The transmitter timing unit 349 operates to produce timing signals of a predetermined frequency which are applied in a given order over leads represented by lead 352 to the transmitter unit 343 and over leads represented by lead 353 to the transmitter control unit 345. The transmitter unit 343 and transmitter control unit 345 operate in response to the timing signals to perform the functions outlined above.

The multiplex signal transmitted over the electrical path 340, which may include, for example, a radio frequency transmission system, is received by the receiver unit 348 located at the second station 2. The seven-unit code characters are applied, in turn, from the receiver unit 348 to a receiver control unit 354 over lead 355. The receiver control unit 354, which may be constructed according to the invention, converts the seven-unit code characters into five-unit code characters. As previously described in detail, equipment is included in the receiver control unit 354 for counting the number of marking elements in each seven-unit code character received. It will be assumed for the moment that all the code characters are properly received without distortion. The converted, five-unit code characters are applied from the receiver control unit 354 back to the receiver unit 348 over lead 356. The receiver unit 348 functions to distribute the code characters transmitted over channel A to a first telegraph printer 357 and the code characters transmitted over channel B to a second telegraph printer 358.

The timing of the receiver unit 348 and of the receiver control unit 354 is controlled by a receiver timing unit 359. Signal energy is applied from a frequency standard unit 360 to a frequency correction unit 361 over lead 362. The receiver unit 348 includes equipment for producing a train of control signals of a frequency corresponding to the frequency of the signal elements included in the multiplex signal received by the receiver unit 348 over the electrical path 340. The train of control signals is applied over lead 363 to the frequency correction unit 361. Timing signals produced by the receiver timing unit 359 are also applied to the frequency correction unit 361 over a lead 364. The frequency correction unit 361 compares the frequency of the control signals received over lead 363 with the frequency of the timing signals received over lead 364. If the control signals are early compared to the timing signals, the frequency of the signal energy applied from the frequency correction unit 361 to the receiver timing unit 359 over lead 365 is adjusted so that the timing signals produced by the operation of the receiver timing unit 359 are advanced. If the control signals are late, the timing signals are retarded. Timing signals of the proper frequency and in a given order are applied from the receiver timing unit 359 to the receiver control unit 354 over leads represented by lead 366 and to the receiver unit 348 over leads represented by lead 367. Interconnections represented by lead 368 are completed between the receiver control unit 354 and the frequency correction unit 361. Timing signals produced by the operation of the receiver control unit 354 are applied over lead 368 to the frequency correction unit 361, while timing signals produced by the operation of the frequency correction unit 361 are applied over lead 368 to the receiver control unit 354. The receiver unit 348 and the receiver control unit 354 are operated in the proper time sequence in response to the timing signals applied thereto to perform the functions outlined above.

While the above description has been directed to the equipment used to complete the transmission of code characters from the first station 1 to the second station 2, the description applies equally well, with one exception, to the equipment used to complete the transmission of code characters from the second station 2 to the first station 1. For ease of description, the corresponding equipment used to complete the transmission of message signals between the two stations 1 and 2 in the different directions has been identified by the same reference numerals, the reference numerals identifying the equipment used to complete the transmission of message signals from station 2 to station 1 being primed. Code characters produced by the operation of the telegraph transmitters 342', 344', as well as necessary control information, are transmitted over the respective channels A', B' to the transmitter unit 343'. The five-unit code characters are converted into seven-unit code characters by the transmitter control unit 345'. The converted code characters are then transmitted by the operation of the transmitter unit 343' in multiplex fashion over the electrical path 341, the transmitter unit 343' including equipment for storing on a continuous basis the last three code characters transmitted over channel A' and the last three code characters transmitted over channel B'. The multiplex signal is received by the receiver unit 348' and the seven-unit code characters converted into five-unit code characters by the receiver control unit 354'. The converted code characters are then distributed in the proper manner over the channels A', B' to the telegraph printers 357', 358', respectively.

Up to this point, it has been assumed that the code characters in the respective multiplex signals transmitted over the electrical paths 340, 341 are received by the receiver units 348, 348', respectively, without distortion. The operation of the stations 1, 2 without the provision for error correction to be described would be similar to that which would occur in any simple two way communication system. If one of the code characters transmitted over channel A and received by the receiver unit 348 at the second station 2 is detected by the receiver control unit 354 as a distorted character (a code character including more than or less than three marking elements), a control signal is applied from the receiver control unit 354 to the receiver unit 348 over lead 356 in the manner outlined above. The receiver unit 348 goes into cycling in response to the control signal, halting the further distribution of the code characters transmitted over channel A to the telegraph printer 357. At the same time a control signal is applied from the receiver unit 348 to the transmitter unit 343′ over lead 369. The transmitter unit 343′ interrupts the transmission of the code characters transmitted over channel A′ by the operation of the telegraph transmitter 342′ and proceeds to transmit a repetition request signal or Signal I plus the last three code characters transmitted over channel A′ and stored by equipment in the transmitter unit 343′. The repetition request signal is detected by the receiver control unit 354′, and a control signal is applied from the receiver control unit 354′ to the receiver unit 348′ over lead 356′. The receiver unit 348′ goes into cycling and prevents the distribution of the repeated code characters transmitted over channel A′ to the telegraph printer 357′. At the same time a control signal is applied from the receiver unit 348′ to the transmitter unit 343 over lead 370. The transmitter unit 343 operates in response to the control signal to interrupt the transmission of the code characters produced by the telegraph transmitter 342 for transmission over channel A. The transmitter 343 unit proceeds to transmit a repetition request signal or Signal I plus the last three code characters transmitted over channel A which were stored by equipment in the transmitter unit 343. The loop time delay of the error correction system is such that the code character received distorted by the receiver unit 348 is stored in the transmitter unit 343. If the code character previously received distorted is now received correctly by the receiver unit 348, the receiver unit 348 goes out of cycling. The communication system resumes its normal condition of operation in which code characters are transmitted from the telegraph transmitter 342 to the telegraph printer 357 over channel A and in which code characters are transmitted from the telegraph transmitter 342′ to the telegraph printer 357′ over channel A′. If, however, the code character is again received distorted, the above sequence of operations will continue until the code character is received correctly by the receiver unit 348.

The correction of the code character received distorted by the receiver unit 348 over channel A does not affect the transmission of the code characters from the telegraph transmitter 344 to the telegraph printer 358 over channel B and from the telegraph transmitter 344′ to the telegraph printer 358′ over channel B′. The transmission of the code characters over the channels B, B′ proceeds in the normal manner. If a code character transmitted over channel B should be received distorted by the receiver unit 348, the receiver unit 348 goes into cycling. The distorted code character is not distributed to the telegraph printer 358, and a control signal is applied from the receiver unit 348 to the transmitter unit 343′ over lead 371. The transmitter unit 343′ interrupts the transmission of the code characters transmitted over channel B′ by the telegraph transmitter 344′ and proceeds to transmit over channel B′ a repetition request signal plus the last three code characters transmitted over channel B′, which were stored by equipment in the transmitter unit 343′. The receiver unit 348′ prevents the distribution of the repeated code characters to the telegraph printer 358′, and a control signal is applied from the receiver unit 348′ to the transmitter unit 343 over lead 372. The transmitter unit 343 interrupts the transmission of the code characters transmitted over channel B by the telegraph transmitter 344 and proceeds to repeat the transmission of the last three code characters transmitted over channel B. When the code character previously received distorted is received correctly, the normal transmission of code characters from the telegraph transmitter 344 to the telegraph printer 358 over channel B and from the telegraph transmitter 344′ to the telegraph printer 358′ over channel B′ resumes. The correction of the code character transmitted over channel B and received distorted by the received unit 348 does not affect either the transmission of code characters from the telegraph transmitter 342 to the telegraph printer 357 over channel A or the transmission of the code characters from the telegraph transmitter 342′ to the telegraph printer 357′ over channel A′. The correction of a code character received distorted over one of the channels A or B proceeds independently of the correction of a code character received distorted over the other channel. The correction of a code character received distorted over channel A and of a code character received distorted over channel B may proceed at the same time following the circuit operations outlined above.

The operation of the communication system in the reverse direction to correct code characters received distorted by the receiver unit 348′ over channels A′ or B′ is exactly the same as when code characters are received distorted by the receiver unit 348 over channels A or B. If a code character is received distorted over channel A′ or B′, the transmitter unit 343′ is operated to repeat the code character until it is correctly received by the receiver unit 348′.

An automatic error correction system of the type described requires that one station in the system be the master, while a second station in the system be the slave. As shown in FIGURE 4, the first station 1 is the master station in that the transmitter timing unit 349 is operated in response to signal energy applied thereto from the frequency standard unit 350 over lead 351. The second station 2 is the slave station in that the transmitter timing unit 349′ is operated in response to signal energy applied thereto from the receiving timing unit 359 over lead 373. The stations 1, 2 in the automatic error correction system must be arranged for synchronous operation to insure the proper operation of the correction loops. If the transmitting timing units 349, 349′ were both operated in response to signal energy applied thereto from a frequency standard unit, a phase difference would exist which would vary by the amount that the two frequency standard units differed in frequency. By applying the signal energy from the receiving timing unit 359 to the transmitter timing unit 349′, the operation of the receiver timing unit 359 being controlled by the frequency correction unit 361, a synchronously operated system is provided.

The code converting and error detecting circuit of the invention by using magnetic cores in the manner described to perform functions previously performed by other equipment is more compact and simpler in operation than circuits known heretofore. Because of these features, the circuit of the invention is valuable and readily adaptable for use in performing code conversion and error detection in systems, for example, of the type described in connection with FIGURE 4. While a single diplex or two channel multiplex telegraph communication system is shown in FIGURE 4, the error correction system described above, including the circuit of the invention, may be incorporated in other multiplex telegraph communication systems known in the art.

What is claimed is:

1. In combination, a source of code characters each including a fixed number of signal elements arranged in a predetermined ratio of signal elements of one nature to signal elements of another nature, said signal elements appearing in a different order in each of said code characters, a first storage device, a second storage device separate from said first storage device, a distributing circuit coupled between said source and both of said devices and arranged upon the reception by said distributing circuit of a received code character to establish an electrical condition in said first device according to the order of appearance of said signal elements of one nature and an electrical condition in said second device according to the order of appearance of said signal elements of another nature, and means including a code converter coupled to both of said devices and responsive to the electrical conditions established in said devices.

2. In combination, a source of code characters each including a predetermined ratio of signal elements of one nature to signal elements of another nature, said signal elements appearing in a different order in each of said code characters, a distributing circuit coupled to said source, an error detecting circuit coupled to said source, a first storage device coupled to said distributing circuit, a second storage device separate from said first storage device and coupled to said distributing circuit, means for operating said distributing circuit upon the reception by said distributing circuit of a received code character to establish an electrical condition in said first device according to the order of appearance of said signal elements of one nature and an electrical condition in said second device according to the order of appearance of said signal elements of another nature, means included in said error detecting circuit responsive to the reception by said error detecting circuit of said received code character to count the number of said signal elements of one nature included therein, and an output circuit coupled to both of said devices and to said error detecting circuit, said output circuit being responsive to the electrical conditions established in said devices and to the operation of said error detecting circuit.

3. In combination, a source of code characters each including a predetermined ratio of signal elements of one nature to signal elements of another nature, said signal elements appearing in a different order in each of said code characters, a distributing circuit coupled to said source, an error detecting circuit coupled to said source, a first storage device coupled to said distributing circuit, a second storage device separate from said first storage device and coupled to said distributing circuit, a second source of signal energy in the form of a train of timing pulses coupled to said distributing circuit and to said error detecting circuit, means included in said distributing circuit responsive to said timing pulses upon the reception by said distributing circuit of a received code character to establish an electrical condition in said first device according to the order of appearance of said signal elements of one nature and an electrical condition in said second device according to the order of appearance of said signal elements of another nature, means included in said error detecting circuit responsive to said timing pulses upon the reception by said error detecting circuit of said received code character to count the number of said signal elements of one nature included therein, and means including a code converter coupled to both of said devices and to said error detecting circuit, said last-mentioned means being responsive to the electrical conditions established in said devices and to the operation of said error detecting circuit.

4. In combination, a source of code characters each including a combination of seven serially appearing signal elements arranged in a ratio of three marking elements to four spacing elements, the marking and spacing elements appearing in a different order in each of said code characters, a first storage device, a second storage device separate from said first storage device, a distributing circuit coupled between said source and both of said devices and arranged upon the reception by said distributing circuit of a received code character to establish an electrical condition in said first device according to the order of appearance of said marking elements and an electrical condition in said second device according to the order of appearance of said spacing elements, an error detecting circuit coupled to said source and arranged upon the reception by said error detecting circuit of said received code character to count the number of said marking elements included therein, and an output circuit including a code converter coupled to both of said devices and to said error detecting circuit, said output circuit being responsive to the electrical conditions established in said devices and to the operation of said error detecting circuit.

5. In combination, a source of code characters each including a predetermined ratio of signal elements of one nature to signal elements of another nature, said signal elements appearing in a different order in each of said code characters, first and second shift registers each including a chain of magnetic cores capable of assuming one of two states, a distributing circuit including a plurality of magnetic cores coupled between said source and both of said registers, means for operating said circuit upon the reception of a code character by said circuit to cause certain of the magnetic cores in said first register to assume one of said states according to the order of appearance of said signal elements of one nature and certain of the magnetic cores in said second register to assume said one state according to the order of appearance of said signal elements of another nature, and means coupled to both of said registers and responsive to the electrical conditions established in said registers.

6. In combination, a source of code characters each including a predetermined ratio of signal elements of one nature to signal elements of another nature, said signal elements appearing in a different order in each of said code characters, first and second shift registers each including a chain of magnetic cores, a distributing circuit coupled between said source and both of said registers, means for operating said distributing circuit upon the reception by said distributing circuit of a received code character to establish an electrical condition in said first register according to the order of appearance of said signal elements of one nature and an electrical condition in said second register according to the order of appearance of said signal elements of another nature, a third shift register including a chain of magnetic cores coupled to said source, means for operating said third register upon the reception by said third register of said received code character to count the number of said signal elements of one nature included therein, and an output circuit coupled to said first, second and third registers, said output circuit being responsive to the electrical conditions established in said first and second registers and to the operation of said third register.

7. A combination as claimed in claim 6 and wherein said distributing circuit includes a plurality of magnetic cores, said plurality of magnetic cores being operated upon the reception by said distributing circuit of each of said signal elements of one nature to apply a control pulse to said first register and upon the reception by said distributing circuit of each of said signal elements of another nature to apply a control pulse to said second register.

8. In combination, a source of code characters each including a predetermined ratio of signal elements of one nature to signal elements of another nature, said signal elements appearing in a different order in each of said code characters, first and second shift registers each including a chain of magnetic cores, a distributing circuit including a plurality of magnetic cores coupled between said source and both of said registers, a second source of signal energy in the form of timing pulses, driving means coupled between said second source and said distributing circuit, said distributing circuit arranged to be operated by said driving means in response to said timing pulses upon the reception of a received code character by said distributing circuit to establish an electrical condition in said first register according to the order of appearance of said signal elements of one nature and an electrical condition in said second register according to the order of appearance of said signal elements of another nature, a third shift register including a chain of magnetic cores coupled to said first source and to said driving means and arranged to be operated by said driving means in response to said timing pulses upon the reception of said received code character by said third register to count the number of said signal elements of one nature included therein, and means including a code converter coupled to said first, second and third registers, said last-mentioned means being responsive to the electrical conditions established in the first and second registers and to the operation of said third register.

9. In combination, a source of code characters each including seven signal elements arranged in a ratio of three marking elements to four spacing elements, said signal elements appearing in a different order in each of said code characters, first and second shift registers each including a chain of magnetic cores, a distributing circuit including a plurality of magnetic cores coupled between said source and both of said registers, a second source of signal energy in the form of timing pulses, driving means coupled between said second source and said distributing circuit, said distributing circuit arranged to be operated by said driving means in response to said timing pulses upon the reception of a received code character by said distributing circuit to establish an electrical condition in said first register according to the order of appearance of said marking elements and an electrical condition in said second register according to the order of appearance of said spacing elements, a third shift register including a chain of magnetic cores coupled to said first source and to said driving means and arranged to be operated by said driving means in response to said timing pulses upon the reception of said received code character by said third register to count the number of marking elements included therein, and an output circuit including a code converter coupled to said first, second and third registers, said output circuit being responsive to the electrical conditions established in said first and second registers and to the operation of said third register.

10. In combination, a source of code characters each including a predetermined ratio of signal elements of one nature to signal elements of another nature, a shift register including a chain of magnetic cores coupled to said source, an output circuit, a single magnetic core coupled between said register and said output circuit, timing means connected to said register for operating said register upon the reception by said register of a received code character to count the number of said signal elements of one nature included therein, said single magnetic core being responsive to the operation of said register to apply a control signal to said output circuit upon the counting by said register of a number other than a predetermined number of said signal elements of one nature in said received code character.

11. A combination as claimed in claim 10 and wherein said timing means includes a source of signal energy in the form of timing pulses.

12. A combination as claimed in claim 10 and wherein said output circuit includes a second shift register including a chain of magnetic cores and having an output terminal.

13. In combination, a source of code characters each including seven signal elements arranged in a ratio of three marking elements to four spacing elements, a shift register including a chain of magnetic cores coupled to said source, an output circuit, a single magnetic core coupled between said register and said output circuit, timing means connected to said register for operating said register upon the reception by said register of a received code character to count the number of said marking elements included therein, said single magnetic core being responsive to the operation of said register to apply a control signal to said output circuit upon the counting by said register of a number other than a predetermined number of said marking elements in said received code character.

14. In combination, a source of code characters each including a fixed number of signal elements arranged in a predetermined ratio of signal elements of one nature to signal elements of another nature, said signal elements appearing in a different order in each of said code characters, first and second storage devices, a distributing circuit coupled between said source and both of said devices and arranged upon the reception by said distributing circuit of a received code character to establish an electrical condition in said first device according to the order of appearance of said signal elements of one nature and an electrical condition in said second device according to the order of appearance of said signal elements of another nature, a shift register including a chain of magnetic cores coupled to said source, an output circuit coupled to and responsive to the operation of both of said devices, a single magnetic core coupled between said register and said output circuit, timing means connected to said register for operating said register upon the reception by said register of said received code character to count the number of said signal elements of one nature included therein, and means to connect said single magnetic core to said timing means for operating said single magnetic core to apply a control signal to said output circuit upon the counting by said register of a number other than a predetermined number of said signal elements of one nature in said received code character.

15. In combination, a source of code characters each including a predetermined ratio of signal elements of one nature to signal elements of another nature, said signal elements appearing in a different order in each of said code characters, first and second shift registers each including a chain of magnetic cores, a distributing circuit coupled between said source and both of said registers, timing means connected to said distributing circuit for operating said distributing circuit upon the reception by said distributing circuit of a received code character to establish an electrical condition in said first register according to the order of appearance of said signal elements of one nature and an electrical condition in said second register according to the order of appearance of said signal elements of another nature, a third shift register including a chain of magnetic cores coupled to said source, an output circuit coupled to and responsive to the operation of said first and second registers, a single magnetic core coupled between said third register and said output circuit, means to connect said third register to said timing means for operating said third register upon the reception by said third register of said received code character to count the number of said signal elements of one nature included therein, and means to connect said single magnetic core to said timing means for operating said single magnetic core to apply a control signal to said output circuit upon the counting by said third register of a number other than a predetermined number of said signal elements of one nature in said received code character.

16. A combination as claimed in claim 15 and wherein said timing means includes a source of signal energy in the form of timing pulses, said output circuit including a shift register comprising a chain of magnetic cores and having an output terminal.

17. In combination, a source of code characters each including seven signal elements arranged in a predetermined ratio of three marking elements to four spacing elements, said signal elements appearing in a different order in each of said code characters, first and second shift registers each including a chain of magnetic cores, a distributing circuit coupled between said source and both of said registers, timing means connected to said distributing circuit for operating said distributing circuit upon the reception by said distributing circuit of a received code character to establish an electrical condition in said first register according to the order of appearance of said marking elements and an electrical condition in said second register according to the order of appearance of said spacing elements, a third shift register including a chain of magnetic cores coupled to said source, an output circuit coupled to and responsive to the operation of said first and second register, a single magnetic core coupled between said third register and said output circuit, means to connect said third register to said timing means for operating said third register upon the reception by said third register of said received code character to count the number of said marking elements included therein, and means to connect said single magnetic core to said timing means for operating said single magnetic core to apply a control signal to said output circuit upon the counting by said third register of a number other than a predetermined number of said marking elements in said received code character.

18. In combination, a source of code characters in a telegraph code each including a fixed number of signal elements arranged in a predetermined ratio of signal elements of one nature to signal elements of another nature, said signal elements appearing in a different order in each of said code characters, a first storage device, a second storage device separate from said first storage device, a distributing circuit coupled between said source and both of said devices and arranged upon the reception by said distributing circuit of a received code character to establish an electrical condition in said first device according to the order of appearance of said signal elements of one nature and an electrical condition in said second device according to the order of appearance of said signal elements of another nature, an output circuit, an error detecting circuit coupled to said source arranged upon the reception by said error detecting circuit of said received code character to count the number of said signal elements of one nature included therein and to apply a control signal to said output circuit upon the counting by said error detecting circuit of a number other than a predetermined number of said signal elements of one nature in said received code character, a code converter coupled between both of said devices and said output circuit responsive to said electrical conditions established in said first and second devices to produce a conversion of said received code character, and means for applying said conversion from said code converter to said output circuit.

19. In combination, a source of code characters in a telegraph code each including a predetermined ratio of signal elements of one nature to signal elements of another nature, said signal elements appearing in a different order in each of said code characters, first and second shift registers each including a chain of magnetic cores, a distributing circuit coupled between said source and both of said registers, timing means connected to said distributing circuit for operating said distributing circuit upon the reception by said distributing circuit of a received code character to establish an electrical condition in said first register according to the order of appearance of said signal elements of one nature and an electrical condition in said second register according to the order of appearance of said signal elements of another nature, a third shift register including a chain of magnetic cores coupled to said source, means to connect said third register to said timing means for operating said third register upon the reception by said third register of said received code character to count the number of said signal elements of one nature included therein, an output circuit, a single magnetic core coupled between said third register and said output circuit, means to connect said single magnetic core to said timing means for operating said single magnetic core to apply a control signal to said output circuit upon the counting by said third register of a number other than a predetermined number of said signal elements of one nature in said received code character, a code converter coupled between both of said first and second registers and said output circuit responsive to said electrical conditions to produce a conversion of said received code character, and means for applying said conversion from said code converter to said output circuit.

20. A combination as claimed in claim 19 and wherein said distributing circuit includes a plurality of magnetic cores, said output circuit including a shift register comprising a chain of magnetic cores and having an output terminal.

21. A code conversion circuit comprising, in combination, input means adapted to receive code characters each including a fixed number of signal elements arranged in an order of signal elements of one nature and signal elements of another nature, a first storage device, a second storage device separate from said first storage device, a distributing circuit coupled between said input means and both of said devices and arranged upon the reception by said distributing circuit of a received code character to establish an electrical condition in said first device according to the order of appearance of said signal elements of one nature and an electrical condition in said second device according to the order of appearance of said signal elements of another nature, an output circuit, a code converting circuit coupled to both of said devices responsive to said electrical conditions to produce a conversion of said received code character, and means to apply said conversion from said code converting circuit to said output circuit.

References Cited in the file of this patent

UNITED STATES PATENTS 2,724,739 Harris ---------------- Nov. 22, 1955